US012681120B2

(12) United States Patent
Murphy

(10) Patent No.: US 12,681,120 B2
(45) Date of Patent: Jul. 14, 2026

(54) BEACON-BASED APPROACH GUIDANCE SYSTEM

(71) Applicant: The Boeing Company, Arlington, VA (US)

(72) Inventor: Timothy Allen Murphy, Marysville, WA (US)

(73) Assignee: The Boeing Company, Arlington, VA (US)

( * ) Notice: Subject to any disclaimer, the term of this patent is extended or adjusted under 35 U.S.C. 154(b) by 287 days.

(21) Appl. No.: 18/624,881

(22) Filed: Apr. 2, 2024

(65) Prior Publication Data

US 2025/0306158 A1      Oct. 2, 2025

(51) Int. Cl.
*G01S 1/08* (2006.01)
*G01S 1/04* (2006.01)

(52) U.S. Cl.
CPC ............... *G01S 1/08* (2013.01); *G01S 1/045* (2013.01)

(58) Field of Classification Search
CPC .................................. G01S 1/08; G01S 1/045
USPC ......................................................... 342/386
See application file for complete search history.

(56) References Cited

U.S. PATENT DOCUMENTS 6,393,046 B1 *   5/2002   Kohli ................... H04B 1/7085
                                                                                375/140
10,620,296 B1   4/2020   Ezal et al.

11,626,971 B2 *   4/2023   Curran .................... H04L 9/008
                                                                              380/255
2011/0117903 A1 *   5/2011   Bradley ............ H04M 1/72463
                                                                                    455/418
2021/0286044 A1 *   9/2021   Knuuttila .............. G01S 5/0284
2025/0306158 A1 *   10/2025   Murphy .................. G01S 1/045

FOREIGN PATENT DOCUMENTS

CN          108520640 B        9/2018
CN          110518934 A    *  11/2019    ........ H04Q 11/0062
WO     WO-2004063897 A2  *   7/2004    ............. G01S 19/30

OTHER PUBLICATIONS

European Patent Office, "Extended European Search Report," issued in connection with European Patent Application No. 25165457.0-1206, dated Aug. 27, 2025, 9 pages.

* cited by examiner

*Primary Examiner* — Harry K Liu
(74) *Attorney, Agent, or Firm* — Hanley, Flight & Zimmerman, LLC

(57)      ABSTRACT

A beacon-based approach guidance system is disclosed. A disclosed method includes digitizing at least one signal received at an antenna array of a receiver of a vehicle to digitized data streams of I and Q samples, the at least one signal received from a beacon, the at least one signal modulated with a pseudorandom code at the beacon, correlating the I and Q samples to a locally generated pseudorandom code of the receiver to recover carrier signals, and calculating, based on relative phase characteristics of the recovered carrier signals, a direction of arrival of the at least one signal from the beacon in a vehicle reference frame.

25 Claims, 20 Drawing Sheets

BEACON-BASED APPROACH GUIDANCE SYSTEM

FIELD OF THE DISCLOSURE

This disclosure relates generally to vehicle guidance and, more particularly, to a beacon-based approach guidance system.

BACKGROUND

Vertical takeoff and landing (VTOL) aircraft can require guidance for landing. Specifically, passenger carrying autonomous commercial VTOL aircraft can necessitate precision positioning and attitude determination to comply with regulatory certifications. Further, some passenger-carrying aircraft can necessitate redundant and/or auxiliary guidance systems.

SUMMARY

An example method includes digitizing at least one signal received at an antenna array of a receiver of a vehicle to digitized data streams of I and Q samples, the at least one signal received from a beacon, the at least one signal modulated with a pseudorandom code at the beacon, correlating the I and Q samples to a locally generated pseudo-random code of the receiver to recover carrier signals, and calculating, based on relative phase characteristics of the recovered carrier signals, a direction of arrival of the at least one signal from the beacon in a vehicle reference frame.

An example apparatus for guidance of a vehicle includes interface circuitry communicatively coupled to an antenna array of the vehicle, the antenna array including respective antennas to receive a signal transmitted from a beacon, the transmitted signal modulated with a pseudorandom code at the beacon, machine-readable instructions, and at least one processor circuit to be programmed by the machine-readable instructions to down convert and digitize signals received at the antenna array to baseband I and Q samples, correlate the I and Q samples to a locally generated pseudorandom code to align the received signals in time, recover carrier signals by modulating the received signals with a synchronized pseudorandom noise (PRN) code to despread the received signals, and calculate, based on relative phase characteristics of the recovered carrier signals, a heading and an elevation of a direction of arrival of the signal transmitted from the beacon in a vehicle reference frame.

An example receiver for guidance of a vehicle includes an array of antennas to receive a signal transmitted from a beacon, the transmitted signal modulated with a pseudoran-dom code at the beacon, a digitizer to digitize signals received at the antennas into digitized signals with I and Q samples, the digitized signals modulated with a locally generated pseudorandom code, and a software-defined radio to correlate the I and Q samples to a locally generated pseudorandom code for recovery of carrier signals from the digitized signals, and calculate, based on relative phase characteristics of the recovered carrier signals, a direction of arrival of the signal from the beacon in a vehicle reference frame.

An example non-transitory machine readable storage medium includes instructions to cause at least one processor circuit to at least digitize signals received at an antenna array of a receiver of a vehicle to data streams of I and Q samples, the signals received corresponding to a transmitted signal from a beacon, the transmitted signal modulated with a pseudorandom code at the beacon, correlate the I and Q samples to a locally generated pseudorandom code of the receiver to align the received signals in time, recover carrier signals by modulating the signals with a synchronized pseudorandom noise (PRN) code to despread the received signals, and calculate, based on relative phase characteristics of the recovered carrier signals, a heading and an elevation of a direction of arrival of the vehicle with respect to the beacon in a vehicle reference frame.

Figure 1:
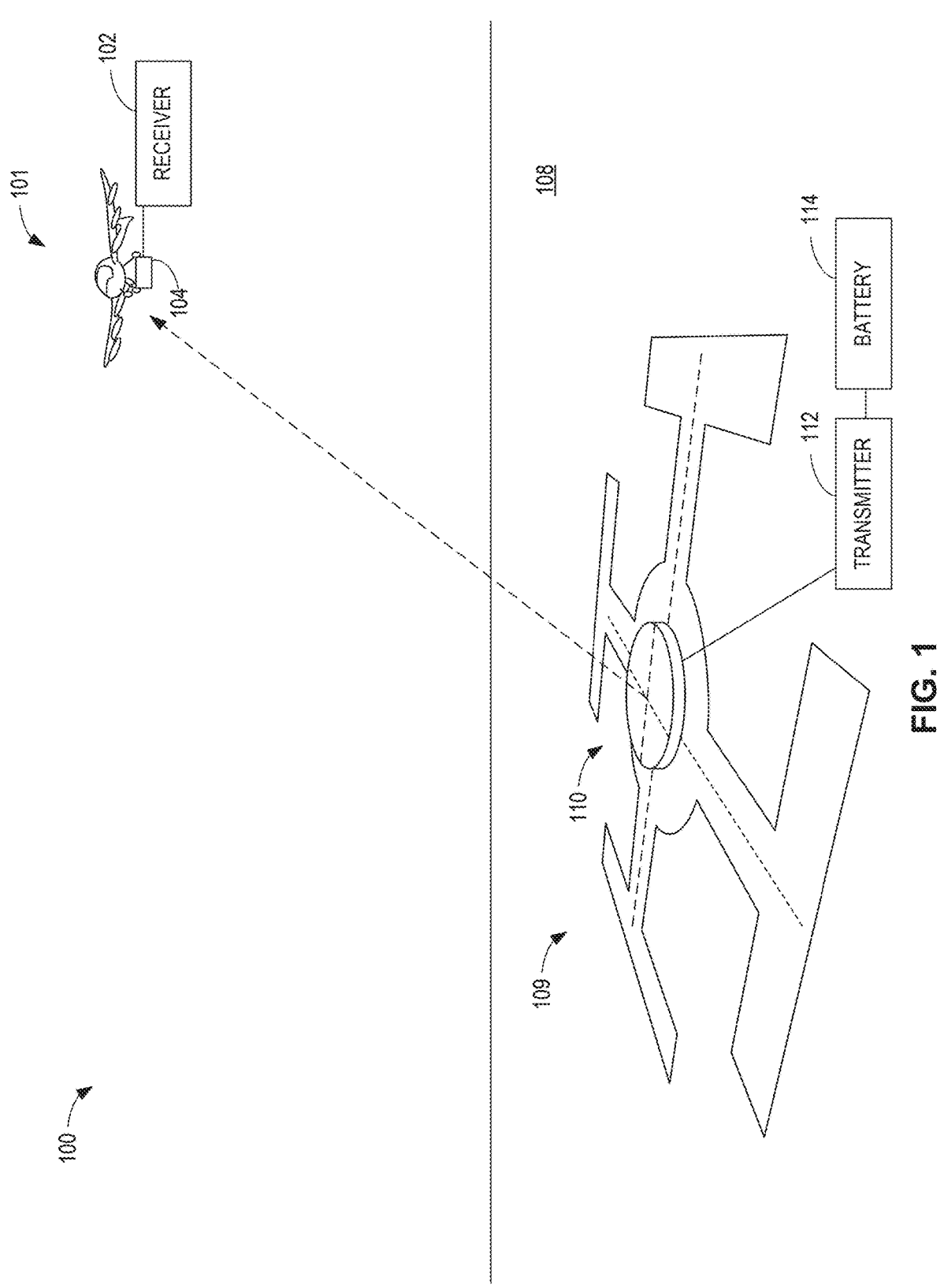
FIG. 1 is an example beacon-based vehicle guidance system in accordance with teachings of this disclosure.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

A beacon-based approach guidance system is disclosed. A vertiport is a landing site to enable aircraft, such as rotorcraft, unmanned aerial vehicles (UAVs), manned vehicles, etc., to land. Some of these aircraft can carry passengers, which can necessitate a requisite degree of accuracy and/or an auxiliary guidance implementation.

Examples disclosed herein enable an approach and landing guidance system for air vehicles, such as for vertical takeoff and landing (VTOL) aircraft. Examples disclosed herein can significantly reduce complexity and cost of ground-based infrastructure. Further, examples disclosed herein can also be highly portable and easy to deploy. Examples disclosed herein do not necessitate a processor. Examples disclosed herein can be implemented on a circuit that can be controlled with a deterministic state machine and, hence, do not necessitate complex software to be developed or certified, which can be time-consuming and costly. Examples disclosed herein can be highly reliable by enabling relatively difficulty-free analysis of potential failure modes. Examples disclosed herein can be implemented on an Application Specific Integrated Circuit (ASIC). According to some examples disclosed herein, only a single selection of a pseudorandom noise (PRN) code to be generated is inputted to a system. In some such examples, the selection can be implemented by a dip switch or soldered links on a circuit board, for example.

Examples disclosed herein utilize a ground-based beacon that transmits at least one signal with a carrier. The signal is modulated with a PRN code via a signal generator and includes a carrier signal. In turn, an antenna array of a receiver of a vehicle (e.g., an aircraft), which can be manned or unmanned, receives the signal. The signal received at the vehicle is down-converted and digitized into data streams of digitized signals that define respective I and Q samples of the baseband signal. The I and Q samples are correlated to a locally generated PRN code in order to align the local code with the code received from the beacon. In turn, the aligned code is utilized to demodulate the incoming signal and, thus, the aforementioned carrier signal is recovered for each element of the antenna array. Based on phases of the recovered carrier signals, at least one of a relative heading, orientation and/or position of the vehicle with respect to the beacon is determined. Additionally or alternatively, a direction of arrival of the signal relative to the vehicle/antenna reference frame is determined. In turn, a position of the vehicle can be determined (e.g., a position of the vehicle in a reference frame of the beacon) utilizing an independent measurement of the height above the landing point in conjunction with the pitch, roll and heading of the aircraft. In some examples, the data streams are provided to discriminators and, in turn, output of the discriminators is utilized to determine an average signal error. According to some examples disclosed herein, the average signal error is utilized to drive a single code generator for recovery of the carrier signals.

In some examples, the beacon transmits a plurality of signals to be detected by the antenna array of the vehicle. In some such examples, the beacon transmits the signals with directional beams that effectively form quadrants of the beacon coverage. In some such examples, signal powers of codes of the carriers are estimated and the signal powers are compared to derive information related to an orientation of the vehicle relative to the beacon.

FIG. 1 is an example beacon-based vehicle guidance system 100 in accordance with teachings of this disclosure. The beacon-based vehicle guidance system 100 of the illustrated example may be referred to as a vertiport approach and landing system (VALS), and includes a vehicle 101 carrying a receiver or receiver circuitry/hardware 102 (hereinafter referred to as receiver 102) and an antenna array 104. While the vehicle 101 is implemented as an aircraft in this example, the vehicle 101 can be implemented as any other appropriate vehicle including, but not limited to, a ground-based vehicle, watercraft, a submersible, spacecraft, etc. In the illustrated example of FIG. 1, a landing area (e.g., a landing pad, a vertiport, etc.) is defined on a surface (e.g., the ground) 108. In turn, the surface 108 of a landing area (e.g., a vertiport, a landing site, etc.) 109 supports a beacon 110, which is ground-based in this example. In turn, the example beacon 110 includes a transmitter 112, and may include a battery 114.

The beacon 110 of the illustrated example is generally circular in shape (e.g., resembling a disc shape) and also has a relatively low profile height. In this particular example, the beacon 110 is approximately 1.5 inches (in) to 2.5 in height relative to the surface 108. However, the beacon may be any other appropriate shape, geometry and/or dimensions. According to some examples disclosed herein, the beacon 110 includes the aforementioned battery 114 to enable portability and relatively quick deployment thereof. According to some other examples, the beacon 110 may be powered by connecting to conventional power infrastructure in a permanent, fixed installation. In some examples, the signal transmitted from the beacon 110 includes a relatively high chipping rate (e.g., 50.9 Mchips). In some examples, multiple ones of the beacons 110 transmit orthogonal codes (e.g., from a family of orthogonal codes) to reduce and/or eliminate interference from proximate beacons. The beacon 110 can transmit a CDMA signal, for example. The example beacon 110 may be self-monitored.

According to examples disclosed herein, the example receiver 102 is to receive at least one signal from the beacon 110 supported by (e.g., standing on) the ground 108. According to examples disclosed herein, the receiver 102 is utilized to determine and/or measure a direction of arrival of at least one signal transmitted from the beacon 110. The direction of arrival can be determined relative to a vehicle reference frame (e.g., as a unit vector pointing from the antenna array to the beacon). In particular, the example receiver 102 can be utilized to determine a heading and an elevation of the vehicle 101 with respect to the beacon 110. Accordingly, the direction of arrival can be utilized to determine a position of the vehicle 101 (e.g., a position of the vehicle 101 relative to the beacon 110, a position of the vehicle 101 in the beacon reference frame, etc.).

The antenna array 104 of the illustrated example includes an antenna array having multiple elements including, but not limited to three elements, four elements, five elements, six elements, etc. According to examples disclosed herein, the antenna array 104 faces a general direction of the beacon 110. In some examples, the antenna array 104 utilizes multiple transmitters.

In some examples, the beacon 110 transmits a code division multiple access (CDMA) signal (e.g., from a family of orthogonal codes). According to some examples disclosed herein, the beacon 110 can transmit multiple signals (e.g., from quadrants of the beacon 110). In some examples, an altitude of the vehicle 101 is maintained via a barometer (e.g., while in flight), radio, laser altimeter, etc. In some examples, the receiver 102 determines a bearing to the beacon 110 based on heading information.

Figure 2:
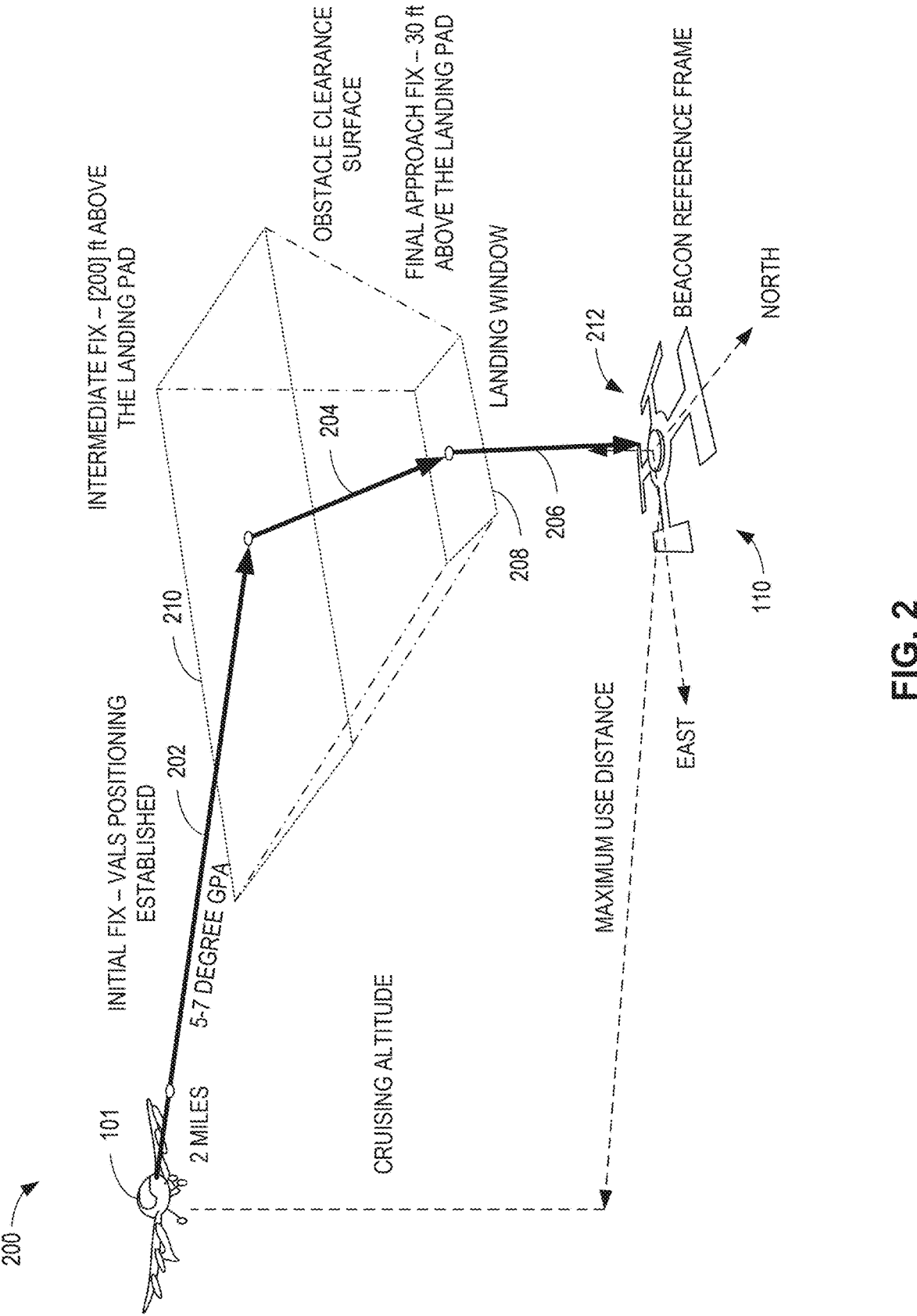
FIG. 2 is an example approach that can be implemented in examples disclosed herein.

FIG. 2 is an example approach 200 that may be implemented in examples disclosed herein. However, any other example approach and/or landing methodology can be implemented instead. In this example, the vehicle 101 is shown approaching the beacon 110 with different phases. As can be seen in the illustrated example of FIG. 2, an initial path 202 is shown in conjunction with an intermediate path 204 and a final approach path 206, which is defined by a landing window 208 that is approximately 30 feet (ft) above the ground in this example. In this example, the intermediate path 204 is defined by an intermediate fix zone 210. Further, the beacon reference frame 212 of the respective beacon 110 is depicted having North, East and vertical components.

Figure 3:
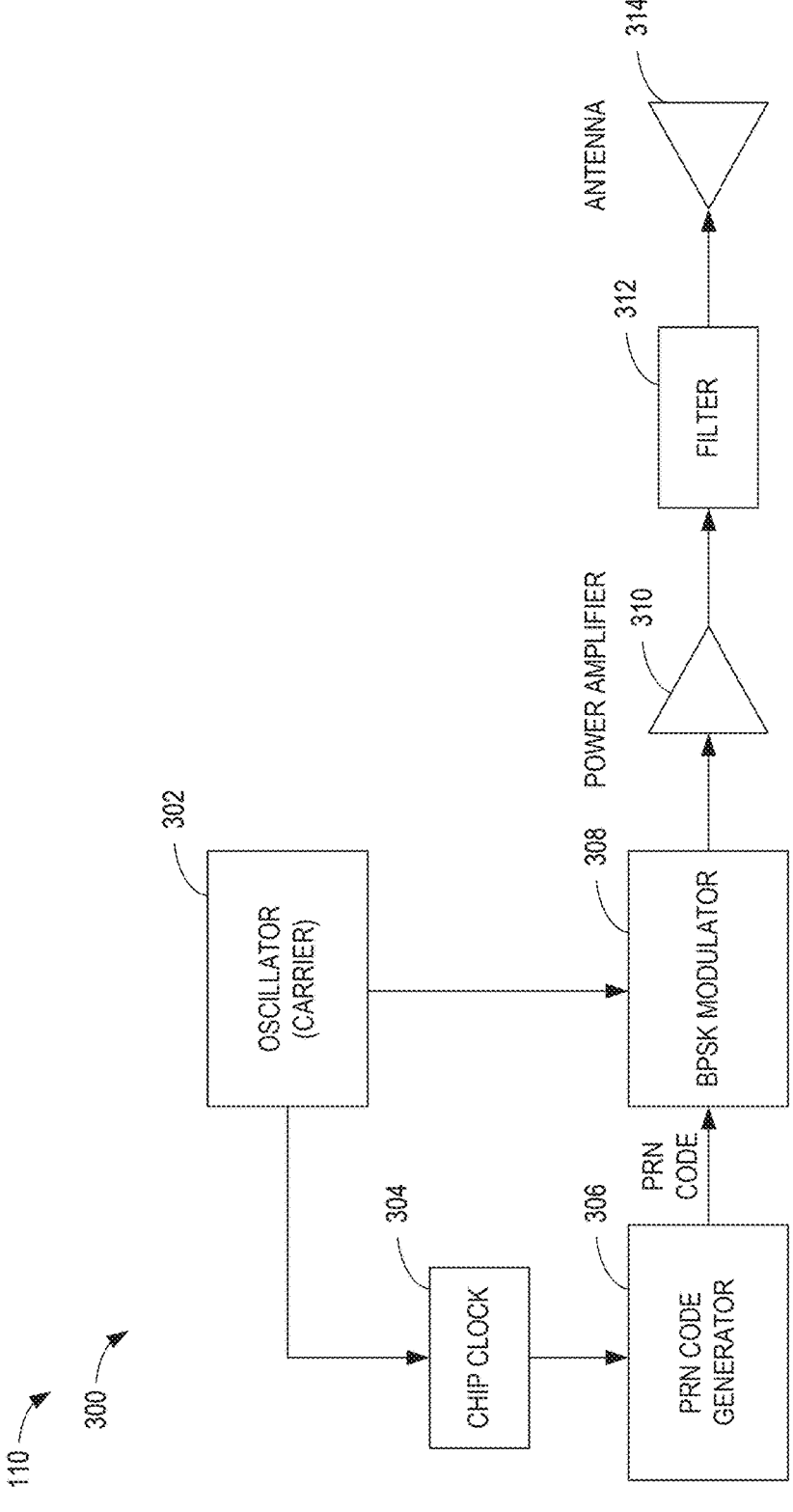
FIG. 3 is a schematic overview of an example beacon circuit in accordance with teachings of this disclosure.

FIG. 3 is a schematic overview of an example beacon circuit 300 in accordance with teachings of this disclosure. The example beacon circuit 300 can be implemented by the beacon 110 and/or the transmitter 112 shown in FIG. 1. The example beacon circuit 300 includes an oscillator (e.g., a carrier signal oscillator) 302, a chipping clock 304, a PRN code generator 306, a modulator 308, which is implemented as a Bi Phase Shift Keyed (BPSK) modulator in this example, an amplifier 310 (e.g., a power amplifier), a filter 312 and an antenna 314. In other examples, the modulator 308 can be implemented as a Quadrature Phase Shift Keying (QPSK) modulator or an Eight Phase Shift Keying (8PSK) modulator or M-ary modulations, etc.

To transmit a signal with a carrier to guide the vehicle 101, the oscillator 302, which corresponds to a carrier signal, drives the chipping clock 304. In turn, the example chipping clock 304 provides a signal to time and/or clock the PRN code generator 306. In this example, an input and/or signal to the PRN code generator 306 from the chipping clock 304 specifies which code from a family of codes the PRN code generator 306 is to produce. In the illustrated example of FIG. 3, the PRN code generator 306 provides a PRN code to the modulator 308 and the modulator 308 modulates the PRN code onto the signal prior to the signal being filtered at the filter 312 and transmitted via the antenna 314. Further, the oscillator 302 provides a carrier input to the modulator 308.

In the illustrated example, the example oscillator 302 operates at a main carrier frequency. In some examples, a carrier signal may be derived via frequency synthesis from another clock operating at a different frequency. In turn, the carrier signal is then divided by a number (e.g., an integer) to derive a chipping clock that is phase coherent with the carrier signal. As a result, examples disclosed herein do not heavily rely on precise timing, thereby reducing a need for clocks and/or clock circuitry/hardware that can be relatively high in cost. According to some examples disclosed herein, the signal only needs to be stable enough to be tracked by a receiver (e.g., an airborne receiver) and examples disclosed herein do not necessitate synchronization with GPS or any external system or a time measurement made by the system. According to examples disclosed herein, information from the beacon is in the origin of its transmission, which is distinct from known implementations that utilize tracking of PRN codes to develop pseudo ranges between a receiver and a transmitter. In contrast, examples disclosed herein do not utilize pseudorange measurements. In this example, the PRN code generator 306 is clocked by the chipping clock 304.

The resultant PRN sequence is a string of pseudorandom bits which are used to modulate the carrier. The resultant modulated signal is a wide bandwidth signal where the carrier has been spread by the chipping code. This modulated signal is amplified, filtered and sent to the antenna for broadcast. The filtering ensures that only the main lobe of the spread spectrum signal is transmitted, thereby preventing unwanted emissions outside the band of interest.

Examples disclosed herein may broadcast a single Direct Sequence Spread Spectrum (DSSS) signal with an antenna that has a nearly omni-directional (or hemispherical) circularly polarized radiation pattern. In some examples, the DSSS signal for each beacon within a radio range is assigned a different coded sequence so that CDMA is used to ensure that multiple beacons at or near a particular vertiport can operate without mutual interference while utilizing the same frequency band. As an example, a beacon signal can be a DSSS signal with a relatively high chipping rate (e.g. 50.9 Mega Chips per second). The DSSS signals grouping can be carefully selected for favorable autocorrelation properties, as well as relatively favorable correlation properties when compared to every other code in the family. This can ensure that when a receiver receives and acquires the signal from a beacon it can be certain that a desired beacon is in fact the one being tracked.

Utilizing CDMA via DSSS can serve multiple purposes in a system. Such an implementation enables multiple beacons to operate in close proximity at a vertiport without a large degree of interference. Further, such an implementation enables elimination or rejection of most of the multipath signals that would be received at a vehicle due to reflections or refractions from objects in the area. With a relatively high chipping rate and a relatively narrow correlator in a receiver, multipath signals with a differential path delay of greater than a fraction of a chip in wavelength can be rejected by a correlation process. The PRN code will have a long length as well so that very long delay multipath will also be eliminated in the decorrelation process. This example signal structure ensures a receiver can track the desired signal with minimal corruption from multipath. Even further, the CDMA arrangement enables the beacon signal to share a spectrum with other services in a band. For example, a 5030 to 5090 megahertz (MHz) frequency band, for example, is planned for use by Command and Control (CC) links for Unmanned Air Vehicles or Autonomous Air Vehicles. Similarly, the 5090 to 5150 MHz band is allocated for use by the AeroMACS datalink system.

Figure 4:
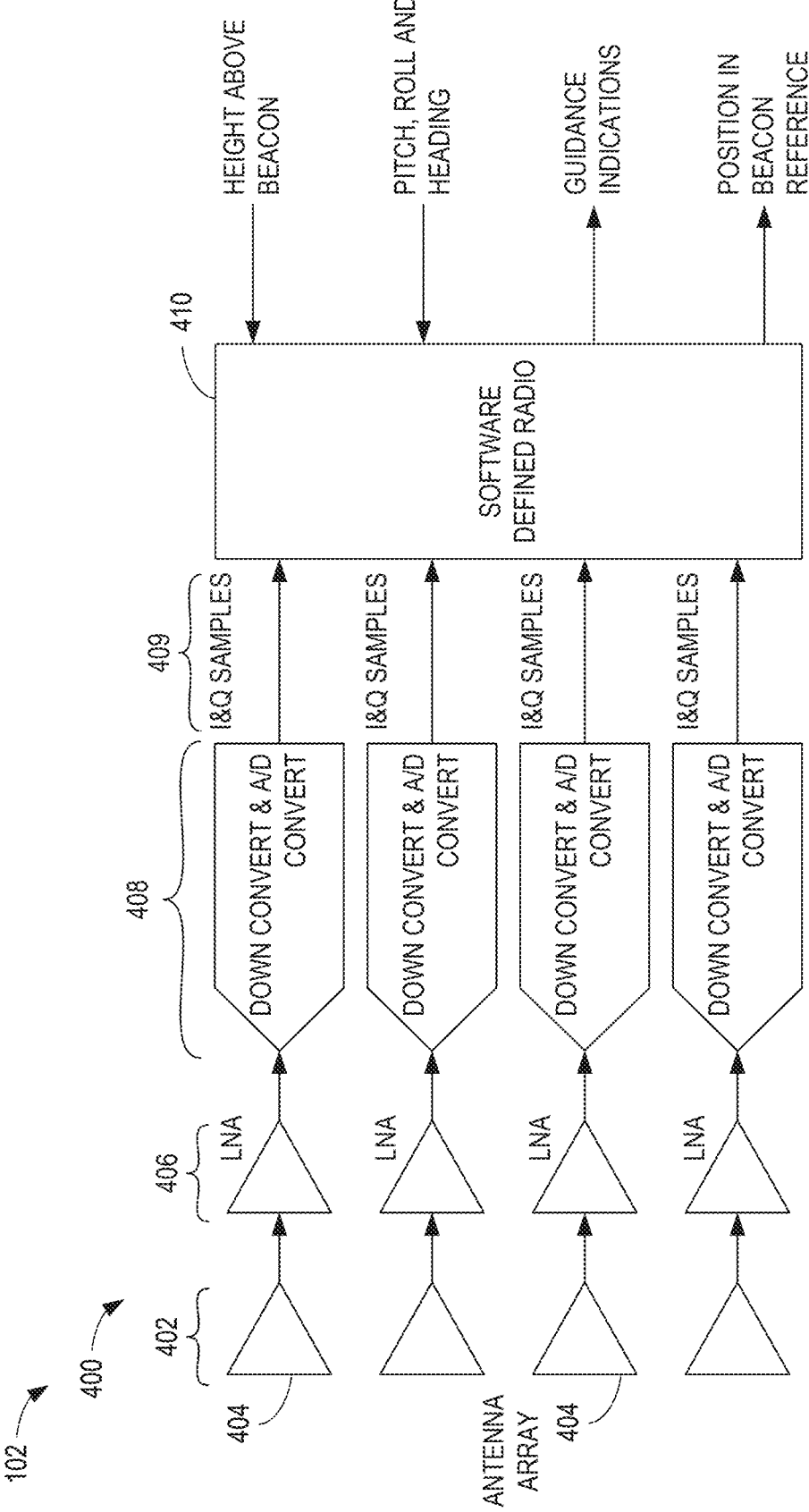
FIG. 4 is a schematic overview of an example receiver in accordance with teachings of this disclosure.

FIG. 4 is a schematic overview of an example receiver implementation 400 in accordance with teachings of this disclosure. The example receiver implementation 400 may be implemented in the receiver 102 shown in FIG. 1. The receiver implementation 400 of the illustrated example includes an antenna array 402 having antennas 404, amplifiers 406, which are implemented as low noise amplifiers 406, digitizers 408, and a software-defined radio 410.

To determine a heading and elevation of the vehicle 101, the example software-defined radio 410 recovers carrier signals by dispreading the PRN code modulated onto a signal transmitted from the beacon 110 shown in FIGS. 1 and 3. To that end, the signal received at the antennas 404 is amplified by the amplifier 406 and downconverted and digitized into data streams 409 that include I and Q samples of the signals at baseband. In turn, the I and Q samples are provided to the software-defined radio 410 to recover the carrier signals received at the antennas 402 by dispreading the signal using a synchronized local copy of the PRN code. The example software-defined radio 410 then utilizes the I and Q samples of the data streams 409 to determine the azimuth and elevation of beacon source relative to the vehicle 101. Additionally or alternatively, the software-defined radio 410 determines a direction of arrival (DoA) of the beacon signal relative to the vehicle 101.

According to examples disclosed herein, the software-defined radio 410 of the receiver 102 utilizes code tracking and carrier phase tracking loops. Accordingly, code tracking may be performed with a delay lock loop (DLL) while carrier tracking may utilize a Costas phase lock loop (or equivalent). In some examples, independent delay lock loops are not necessitated for each antenna element. The example of FIG. 4 illustrates a particular example for code tracking and carrier recovery that can be implemented in examples disclosed herein. In this example, the software-defined radio 410 of the illustrated example utilizes a string of digitized I and Q samples from the digitized streams. In turn, streams of the I and Q samples from all four of the antennas 404 is provided to a processor and/or processor circuitry, which correlates the I and Q samples against a locally generated version of the PRN code. When the local copy is synchronized with the received code, the carrier in each of the four channels is recovered. This is accomplished via the software defined radio 410 such that block processing techniques can be used to initially acquire the long-coded sequence and synchronize delay lock loops with the incoming signal. The phase of the recovered carriers can be used to determine the direction of arrival of the signal (e.g., given knowledge of the antenna array geometry). In this manner, the receiver 102 determines the azimuth and elevation of a beacon signal relative to the antenna array 402. This can be equivalent to measuring a unit vector from the phase center of the airborne array pointing to the beacon 100 on the ground in an aircraft body reference frame.

While four of the antennas 404 are included in the antenna array 402, any other appropriate number of antennas can be implemented instead (e.g., three, five, six, seven, eight, nine, ten . . . twenty . . . fifty, etc.). In some examples, the software-defined radio can utilize an independently measured height above the beacon 110, and pitch/roll/heading of the vehicle 101. According to some examples disclosed herein, the software-defined radio 410 can determine guidance indications/commands and/or a position of the vehicle 101 in a beacon reference frame.

Figure 5:
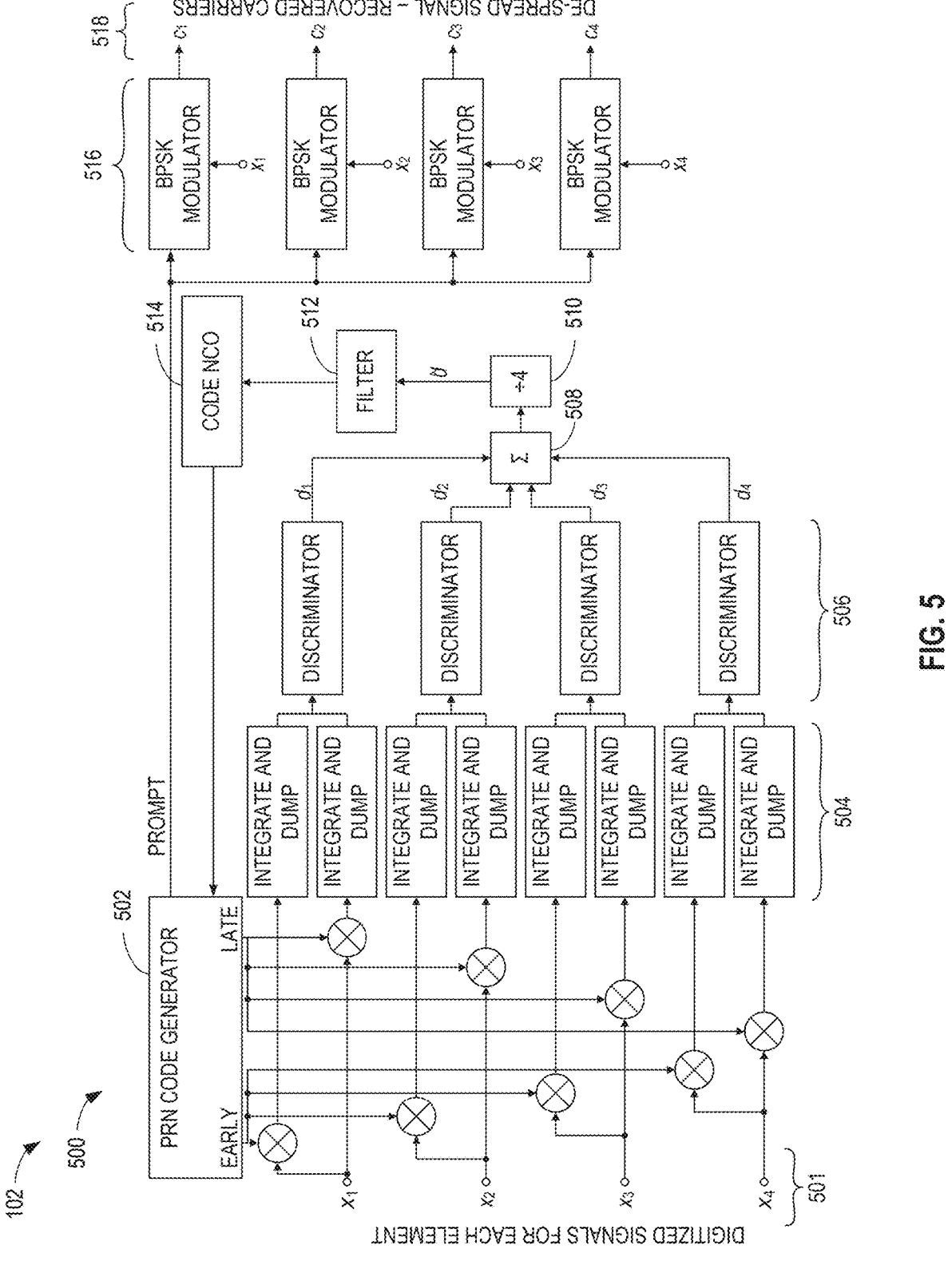
FIG. 5 is a schematic overview of an example receiver circuit in accordance with teachings of this disclosure.

FIG. 5 is a schematic overview of an example receiver circuit 500 in accordance with teachings of this disclosure. The example receiver circuit 500 may be implemented in the receiver 102 shown in FIG. 1 and/or the software-defined radio 410 shown in FIG. 4. In the illustrated example of FIG. 5, the example receiver circuit 500 is to receive digitized signal streams corresponding to each antenna element. The example receiver circuit 500 includes a PRN code generator 502, integrators 504, discriminators 506, a summing device 508, a divider 510, a filter 512, a code numerically controlled oscillator (NCO) 514, and modulators 516, which are implemented as BPSK modulators in this example.

To recover and/or de-spread carrier signals 518 from the aforementioned data streams 501, the example PRN code generator 502 provides PRN codes to each of the data streams 501, and the integrators (e.g., integrate and dump filters) 504 and the discriminators 506 act as a delay lock loop (DLL) to track and synchronize with the incoming prn coded signal. The combination of correlation of the early and late copies of the PRN code enables determination of errors in the synchronization of the local PRN prompt replica with each of the incoming PRN data streams 501. According to some examples disclosed herein, the summing device 508 and the divider 510 are implemented to determine an average error in the synchronization of the data streams 501. In turn, the average error is provided to the Numerically Controlled Oscillator (NCO) that clocks the PRN code generator 502 that produces the PRN code generator 502 that is provided to the bi-phase modulator 516 to despread the signal for recovery of the carriers 518. In this arrangement, four DLLs are employed, which corresponds to one for each incoming signal. The error signals produced by the four DLLs are averaged to form the error signal that drives the NCO that clocks the single PRN generator that drives each DLL.

Example disclosed herein advantageously utilize a signal PRN code generator such that each of the four digitized streams 501 of I and Q samples, $\{x_1, x_2, x_3, x_4\}$ is provided to a delay lock loop (defined by the integrator 504 and the discriminator 506) where the signals are multiplied by locally generated copies of the code with an early and late offset by some fraction of a chip. For example, the early and late copies of the PRN code may be delayed by one tenth of a chip interval relative to the prompt code. According to examples disclosed herein, the signals are correlated with an integrate and dump filter and the results of the correlators are provided to the discriminators 506. According to examples disclosed herein, outputs of the discriminators 506 for the four different branches, $\{d_1, d_2, d_3, d_4\}$ are summed and then divided by four, so that the result is an averaged error signal, $\hat{d}$, which is used to drive the NCO 514 that drives a code generator 502. In turn, a prompt version of the code is then used to de-spread the four input signals, $\{x_1, x_2, x_3, x_4\}$, to recover the set of carriers 518, $\{c_1, c_2, c_3, c_4\}$. The recovered set of carriers 518 then form the basis for a Direction of Arrival (DoA) determination. Many suitable DoA techniques are available and well known in the literature such as MUSIC (Multiple Signal Classification), beamscan, minimum-variance distortionless response, 2-D MUSIC, root-MUSIC, etc. As a result of using the average of the four delay lock loop correlations for the measurement, noise across the four channels is averaged while the desired signal power is improved.

Figure 6:
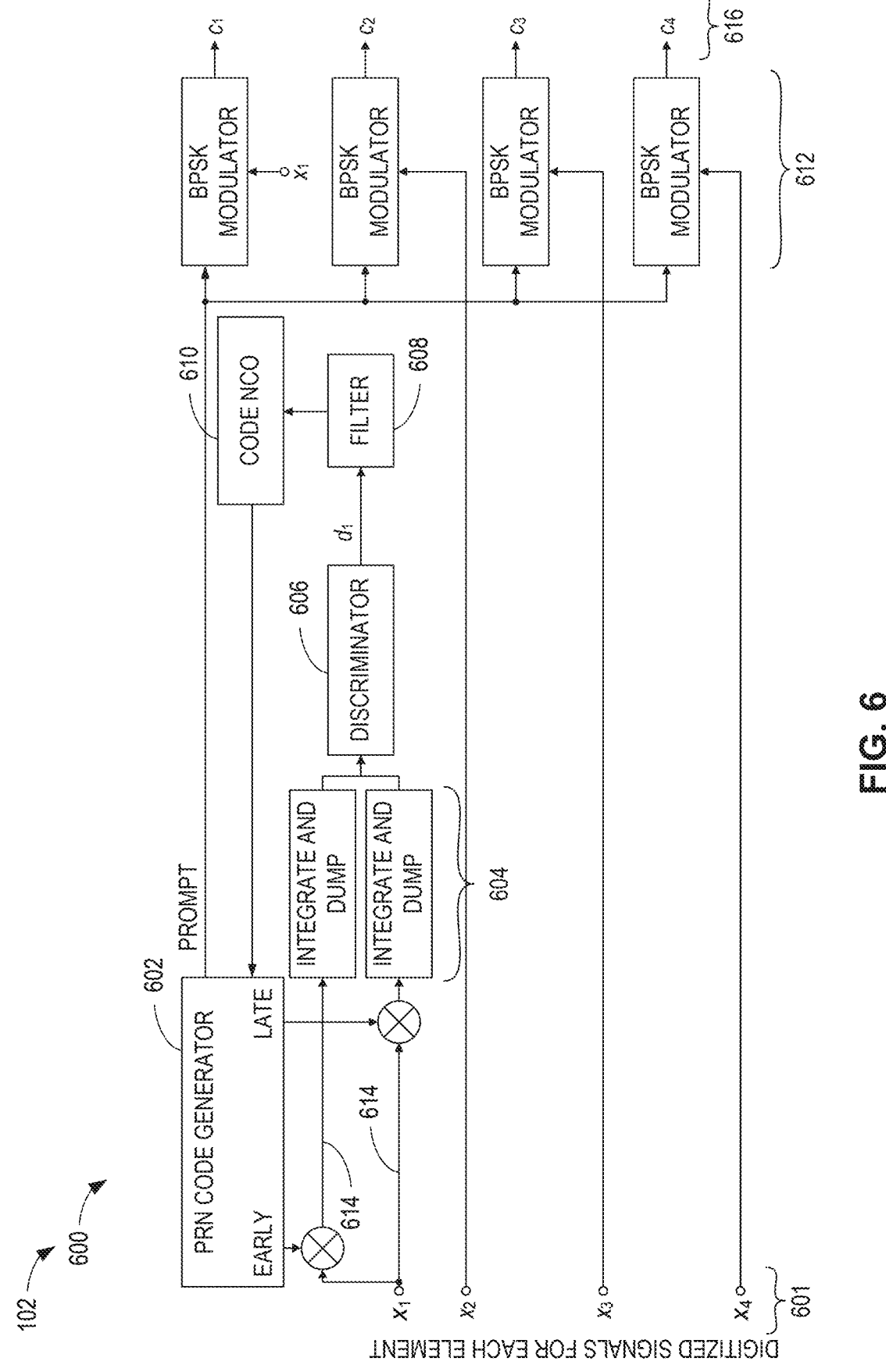
FIG. 6 is a schematic overview of another example receiver circuit in accordance with teachings of this disclo-sure.

FIG. 6 is a schematic overview of another example receiver circuit 600 in accordance with teachings of this disclosure. The example receiver circuit 600 may be implemented in the receiver 102 shown in FIG. 1 and/or the software-defined radio 410 shown in FIG. 4. Similar to the example receiver circuit 500 of FIG. 5, the example receiver circuit 600 receives digitized signal streams 601 corresponding to each antenna element. However, in contrast to the example receiver circuit 500, the receiver circuit 600 determines an error and/or delay from one of the signal streams 601. The example receiver circuit 600 includes a PRN code generator 602, integrators 604, a discriminator 606, a filter 608, a code NCO 610, and modulators 612, which are implemented as BPSK modulators in this example. In this example, a single DLL is applied to one of the four input signals in order to synchronize a locally generated PRN code with PRN coding of the incoming signals. The synchronized PRN code is then used to despread the four incoming signals.

In the illustrated example of FIG. 6, the PRN code generator 602 provides PRN codes to multiple branches 614 of one of the signal streams 601. Accordingly, the discriminator feeds an error to the filter 608 and the NCO 610. In turn, the PRN code generator 602 drives the modulators 612 to recover carrier signals 616 from the aforementioned signal streams 601.

Figure 7:
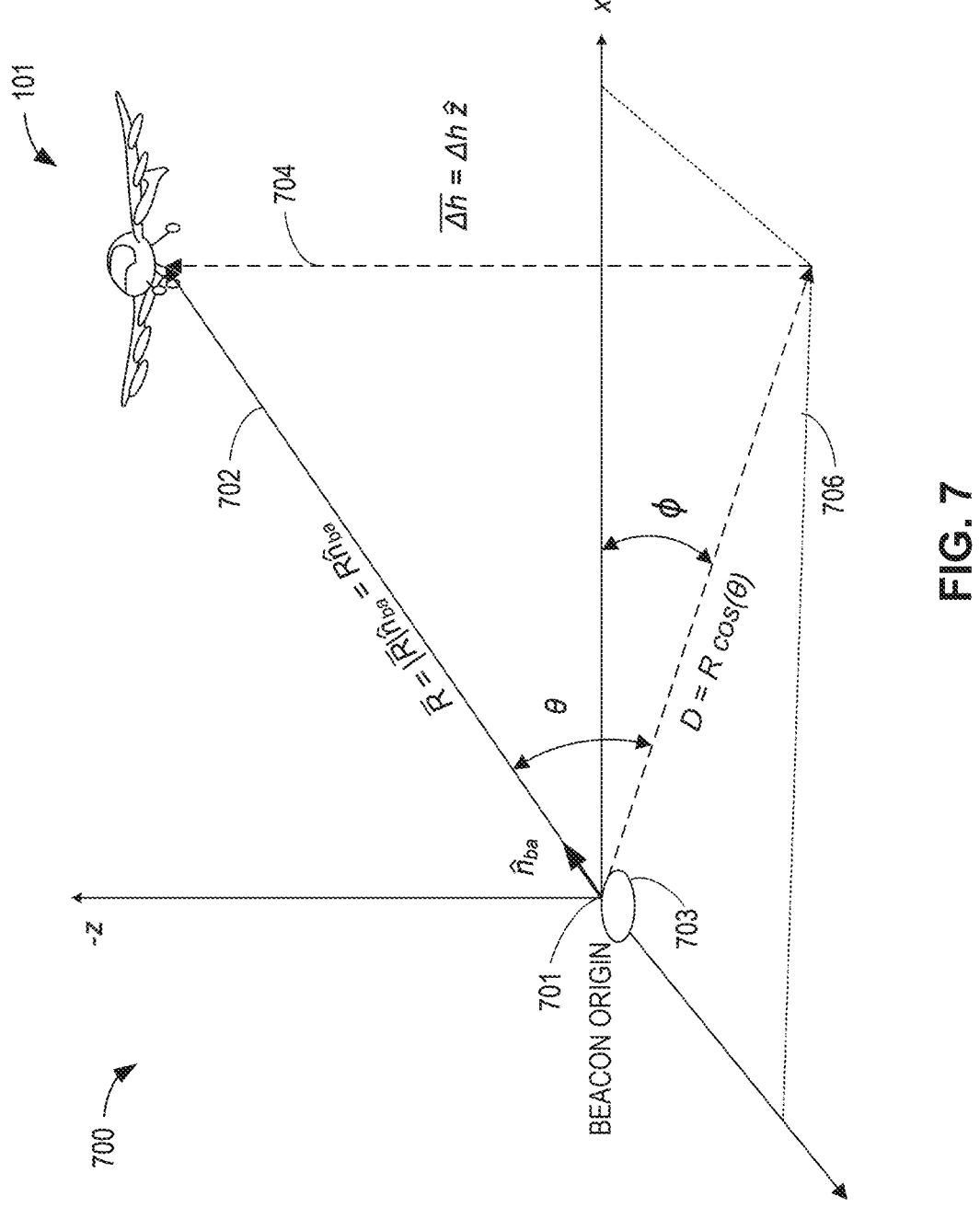
FIG. 7 illustrates an example computation in a beacon reference frame that can be implemented in examples dis-closed herein.

FIG. 7 illustrates an example computation in a beacon reference frame that can be implemented in examples disclosed herein. In this example, a reference frame 700 is shown with an origin 701 at a beacon 703 with respect to the vehicle 101. Further, a vector 702 is shown between the beacon origin 701 and the vehicle 101. Further, a vector 704 represents a difference in height between the beacon origin 701 and the vehicle 101 while a vector 706 corresponds to a general heading/bearing between the beacon origin 701 and the vehicle 101.

In this example, a vehicle receiver (e.g., the receiver 102 of FIG. 1) measures $\tilde{n}_{ab}$, a unit vector from a vehicle antenna to a beacon based on DoA measurements. In this example, the unit vector is defined in the aircraft reference frame. According to some examples disclosed herein, a pitch, roll and heading of a platform is provided by external systems and utilized to compute the transformation matrix $T_{AC \rightarrow BRF}$, which transforms from the vehicle reference frame to a local level North East Down reference frame.

According to examples disclosed herein, the receiver computes $\hat{n}_{ba} = -\hat{n}_{ab} T_{AC \rightarrow BRF}$, which is a measured vector from an airborne antenna to a ground beacon transformed to a reference frame of a beacon. As a result, a unit vector from the beacon to the aircraft in the beacon reference frame is obtained. Noting example Equation 1:

$$\hat{n}_{ba,z} = \sin(\theta), \text{ compute: } \theta = \arcsin(\hat{n}_{ba,z}) \tag{1}$$

And also noting below from example Equation 2:

$$\frac{\hat{n}_{4,y}}{\hat{n}_{4,x}} = \tan(\phi), \text{ compute: } \phi = \arctan\left(\frac{\hat{n}_{4,y}}{\hat{n}_{4,x}}\right) \tag{2}$$

Example equation 3 can be utilized to calculate a height difference:

$$\Delta h = R \sin(\theta), \text{ compute: } R = \frac{\Delta h}{\sin(\theta)} \tag{3}$$

Example equation 4 can be utilized to calculate a distance:

$$D = R \cos(\theta), \text{ compute: } D = \frac{\Delta h \cos(\theta)}{\sin(\theta)} = \frac{\Delta h}{\tan(\theta)} \tag{4}$$

Example Equation 5 can then be derived as follows:

$$x = D \cos(\phi) = \frac{\Delta h \cdot \cos(\phi)}{\tan(\theta)} \tag{5}$$

Accordingly, y and z can be calculated as shown in example Equations 6 and 7:

$$y = D \sin(\phi) = \frac{\Delta h \cdot \sin(\phi)}{\tan(\theta)} \tag{6}$$

$$z = -\Delta h \tag{7}$$

The example calculations shown are only examples and any other appropriate calculations and/or methodology can be implemented instead. Also without loss of generality, the computations discussed herein can be performed with a receiver as described or in some external system which has been provided with the observation of unit vector, $\hat{n}_{ba}$, made by the receiver.

Figure 8:
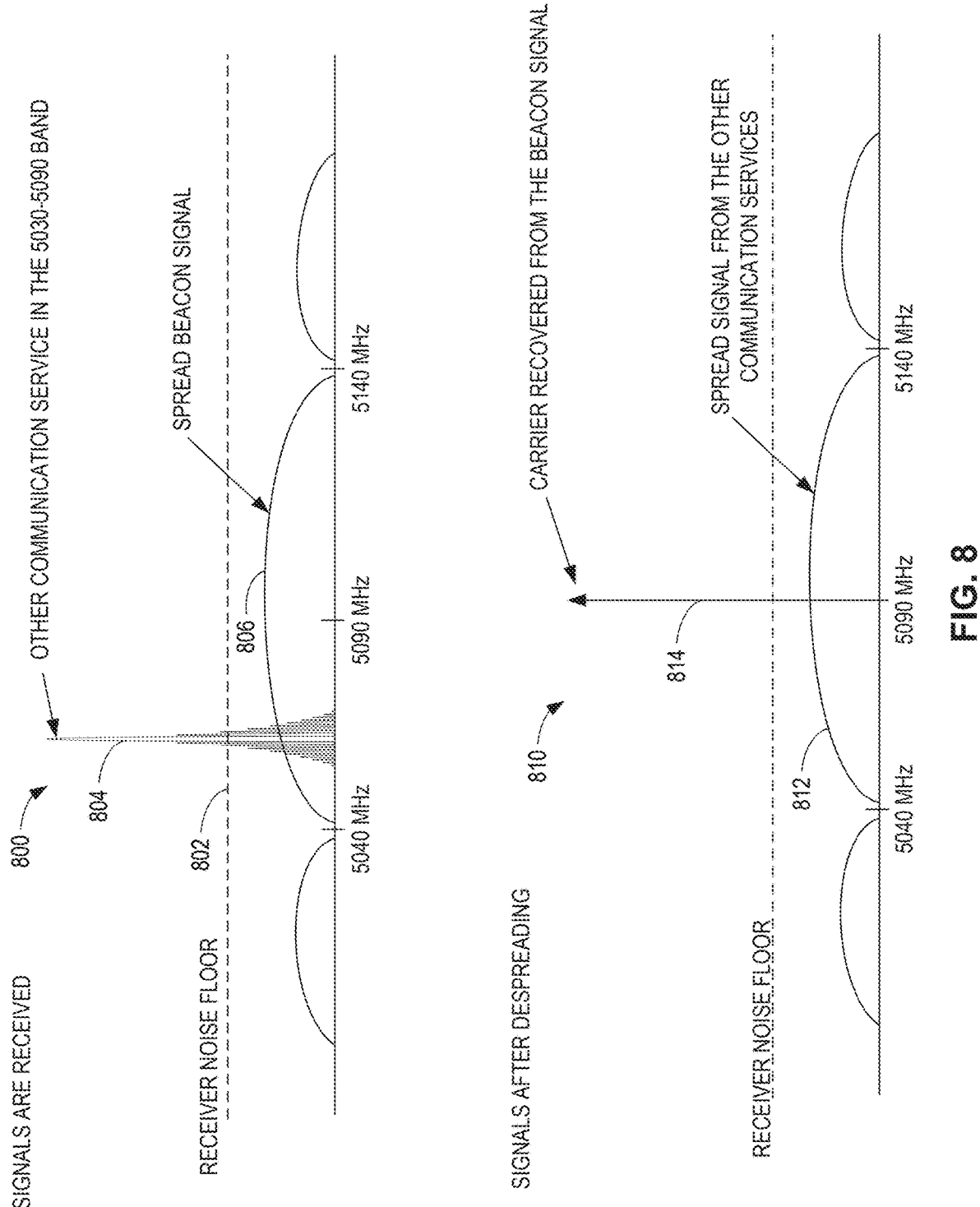
FIG. 8 illustrates example signals that can be imple-mented in examples disclosed herein.

FIG. 8 illustrates example signals that can be implemented in examples disclosed herein. In the illustrated example of FIG. 8, an example graph 800 depicts a receiver noise floor 802 with respect to other/external signals 804, as well as a spread beacon signal 806. Likewise, an example graph 810 depicts a spread signal 812 of other/external signals 804 along with a carrier signal 814 recovered from a beacon constructed in accordance with teachings of this disclosure.

According to some examples disclosed herein, utilization of Direct Sequence Spread Spectrum (DSSS) or Code Division Multiple Access (CDMA) signals enables examples disclosed herein to share frequencies in a band. To illustrate this, an example signal structure is described herein. However, any other appropriate signal structure can be implemented instead. Examples disclosed herein may transmit a signal with the following characteristics: a carrier that is BPSK modulated with a PRN code, a carrier frequency at approximately 5090 MHz, a chipping clock is derived by dividing the carrier by 100 (e.g., 50.9 Mega-chips per second). Accordingly, reflections with a differential path delay greater than 5.89 meters (m) will be rejected. In some examples, a long code repetition interval is used, such as $2^{16}$ chips (i.e. 65,536 chips), for example. This can imply that all multipath with a differential path delay of less than 386.26 kilometers (km) are to be rejected. No data is modulated onto the carrier, so a very narrow post correlation bandwidth can be used. Assuming 10 hertz (Hz) is adequate for a carrier tracking loop bandwidth, then the processing gain can be equal to $10*\log 10 ((50.0*106/10))=67$ dB. Accordingly, a relatively low power is utilized for the beacon at 10 dBm or 0.01 Watts. As a result, this wide band spread spectrum signal can enable sharing of the band with other users as illustrated in FIG. 8. In some examples, a low power beacon (0.01 Watt EIRP) is spread over +/−50.9 MHz and is well below the noise floor for the other services and will not significantly degrade a signal to noise ratio (S/N) for those services. The spread spectrum processing rejects signals of the other services by spreading them as if they were interference signals. In some examples, after acquiring the code and dispreading the desired signal, undesired signals from the other services are spread and will contribute to the noise floor of the carrier to thermal noise plus interference ratio, C/(No+I). However, according to examples disclosed herein, given a relatively high processing gain, there should still be enough signal to noise to support signal tracking and recovery of the carrier and subsequent determination of the Direction of Arrival of the signal.

Figure 9:
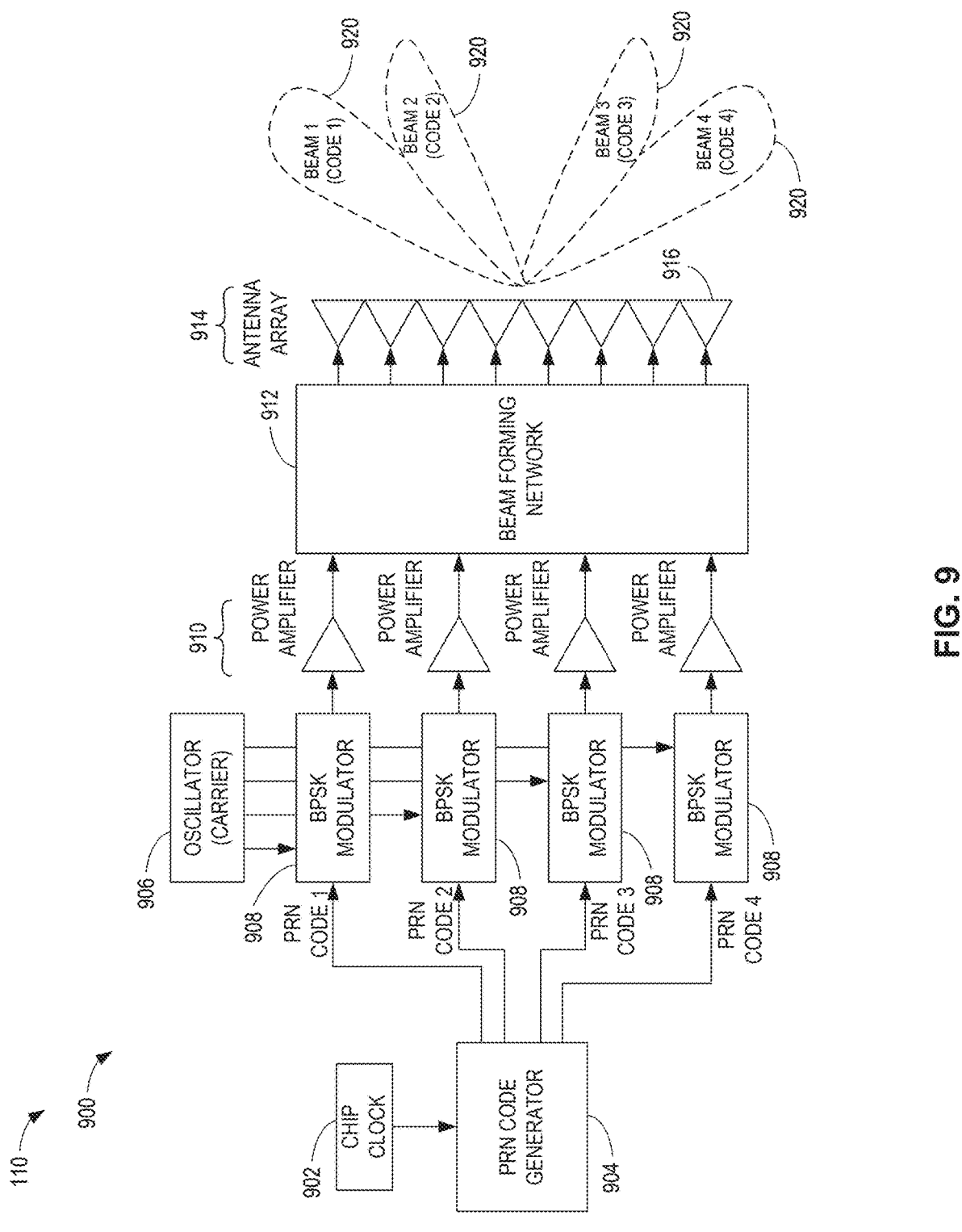
FIG. 9 is a schematic overview of another example beacon circuit in accordance with teachings of this disclo-sure.

FIG. 9 is a schematic overview of an alternative example beacon circuit 900 in accordance with teachings of this disclosure. The example beacon circuit 900 may be implemented in the beacon 110 and/or the transmitter 112 shown in FIG. 1. In the illustrated example of FIG. 9, the beacon circuit 900 includes a chipping clock 902, a PRN code generator 904, an oscillator or carrier clock 906, modulators 908, which are implemented as BPSK modulators in this example, amplifiers (e.g., power amplifiers) 910, a beam forming network 912 and an antenna array 914 having antennas 916.

In the illustrated example of FIG. 9, the beacon circuit 900 produces beams 920 with four phase locked CDMA signals that utilize orthogonal (e.g., fully orthogonal) codes with a relatively high chipping rate. All the signal design considerations discussed above are still applicable. The example beacon circuit 900 has an antenna array that is implemented to radiate in four quadrants. The four codes are broadcast along the four quadrants. Accordingly, a corresponding receiver (e.g., an airborne receiver) can demodulate the four signals and a relative position of the vehicle 101 can be determined by comparing the received power on each of the four codes corresponding to the signals. The example four quadrant antenna is aligned with cardinal directions such that the vehicle 101 can determine a general direction of the beacon based on amplitudes of signals being tracked in a generally difficult-free manner.

According to some examples disclosed herein, the clock 906, and the chipping clock 902 are derived from a common oscillator so that the resultant signals are relatively coherent. In particular, the chipping clock 902 simultaneously clocks for different code generators, each programmed to produce a different pseudorandom bit stream from a family that is orthogonal, for example. Each bit stream is used to separately modulate the carrier. In turn, individual modulated signals are amplified and fed to different inputs of the beam forming network 912. The example beam forming network 912 can produce an appropriate phase and amplitude distributions to excite an NxN element array to produce the four beams 920. The beams 920 are arranged to be essentially orthogonal and produce four quadrants with one code per quadrant each aligned with a cardinal direction, for example. One such example arrangement is illustrated in FIG. 10.

While the example of FIG. 9 includes four signals and four quadrants, any other appropriate number of signals and beams from two to N can be implemented instead. Further, N resultant beams do not necessitate alignment in any particular way with the cardinal directions. The N beams will define N radials where generally equal power is received for two different codes in adjacent beams. If an order of beams and associated codes is known, along with an overall relationship of the beams to a beacon reference frame, then a receiver can determine its relative angle to that beacon.

In another example, a beacon can be utilized with a receiver having a single antenna and DoA processing and/or computations would not be performed at a vehicle. In such examples, the receiver can produce guidance based on a difference in signal power received as described in FIG. 10. In such examples, capturing a radial and following it to a zenith point can be employed. Such examples would not produce a general x, y and z positioning with respect to the beacon reference frame. Such an operation is closer to operating an Instrument Landing System (ILS) where a vehicle can fly a specific procedure and is provided guidance to bring it to a position generally directly above a landing zone. In turn, vertical descent of the vehicle can then be accomplished based on corrected barometry, radio or laser altimetry.

Figure 10:
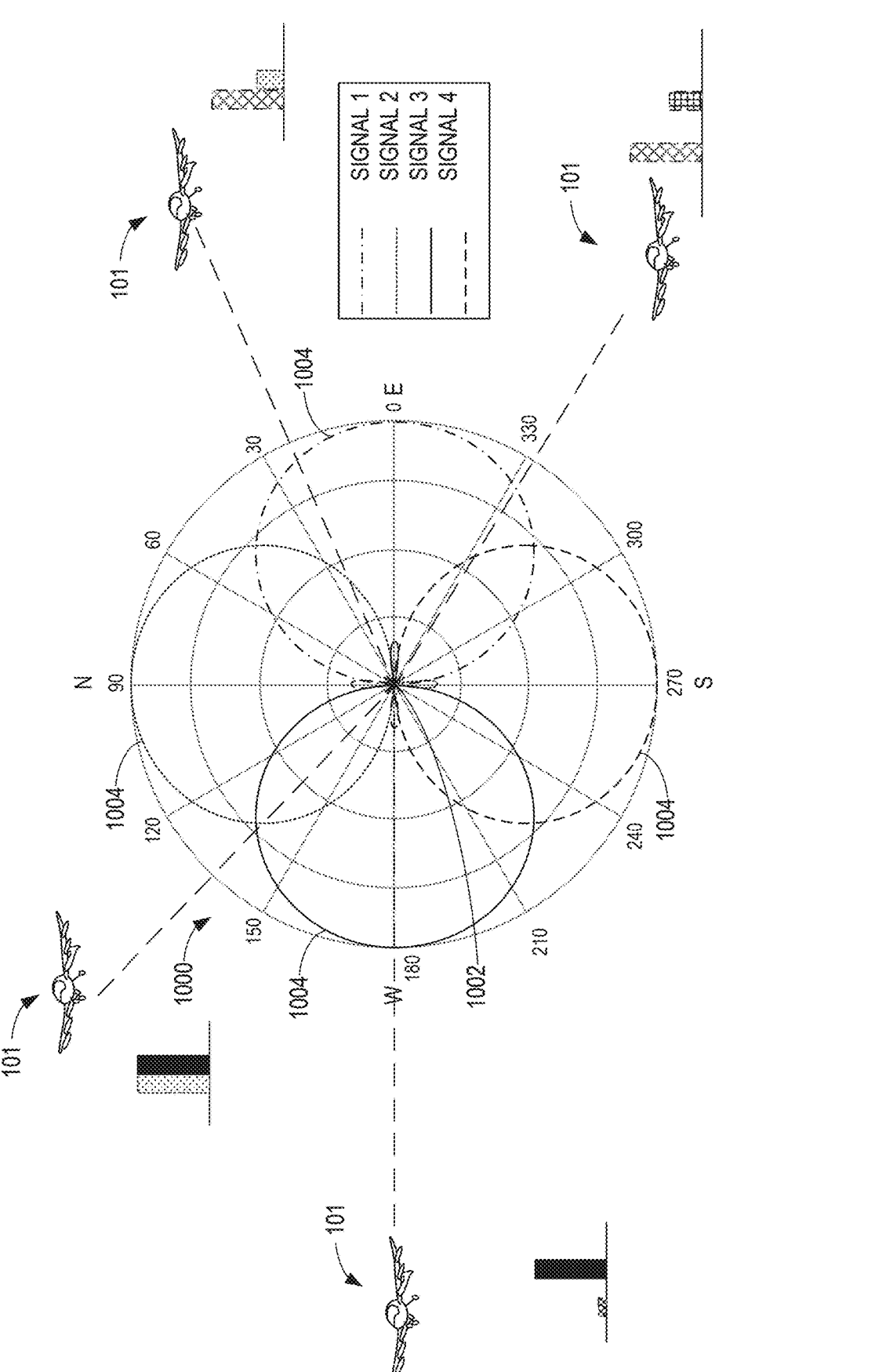
FIG. 10 illustrates an example quadrant antenna that can be implemented in examples disclosed herein.

FIG. 10 illustrates example results of a quadrant antenna that can be implemented in examples disclosed herein. In the illustrated view of FIG. 10, an origin 1002 corresponding to a beacon (e.g., the beacon circuit 900) is shown with respect to radiated beams 1004 along different headings relative to the vehicle 101 shown in four different positions relative to the beacon. In this example, different carrier signals and/or power readings are indicated for the different positions of the vehicle 101. Accordingly, a receiver of the vehicle 101 can determine a DoA and/or a heading/elevation to the aforementioned beacon. In some examples, an angle to the beacon can be determined by comparing the amplitudes of signals received.

In this example, four beams are produced using a 4×4 array of circular patch elements. Further, amplitude tapering is utilized to suppress sidelobes to enable a single beam to dominate in any given quadrant, for example. As shown in FIG. 10, an x-axis of an array reference frame is aligned with the cardinal direction East. FIG. 10 further depicts examples of aircraft at various orientations to the beacon and illustrates relative signal levels that can be received by the vehicle 101 at those locations. One example shown in FIG. 10 is the vehicle 101 at 45 degrees from North. An example convention adopted is that the Beacon reference frame has the x-axis aligned with East, the y-axis aligned with North and the z-axis aligned with the vertical direction pointing up to complete a right-hand coordinate system. Accordingly, the vehicle 101 in this example would be at an azimuth of 135 degrees in a defined beacon coordinate system. For example, when signal powers received for signal 2 and signal 3 are equal, a radial extending in the North-West direction is formed. Further, when the power received on those two signals is equal, the receiver detects that it is on the radial and the fact that it is receiving signal 2 and signal 3 indicates that the receiver is North and West of the Beacon, such that an unambiguous bearing to the beacon can be derived.

According to some examples disclosed herein, an accuracy of a bearing estimate can depend on a bearing. For example, the vehicle 101 shown as West of the beacon (e.g., an azimuth of 180 degrees in the beacon reference frame) will receive only signal 3 with a significant amount of power. The relative signal power for signals 2 and 4 are 20 to 30 dB or more down from signal 1 across a range of angles from about 165 degrees to about 195 degrees, for example. So, in that range, the vehicle 101 may only determine that it is West of the beacon. In order to get a more precise indication of the relative bearing the vehicle 101 would need to maneuver into a position where two frequencies can be received, knowledge of the order of the signals can be utilized, and, subsequent to the first signal being acquired, the vehicle 101 can fly in a pattern that would result in capturing one of the equal signal strength radials, in a similar manner to capturing a localizer course with an ILS. A four-quadrant beacon can provide four potential localizer type references leading to the beacon, for example. Similarly, an eight beam system can produce eight radials leading to the beacon, and so forth. However, additional beams can necessitate that airborne equipment searches through an increased number of codes for an initial acquisition. However, once a code is acquired, then only two codes are necessitated to be tracked at a time to obtain an azimuth. Vertical guidance can be relatively weak from multi-sector beacons. However, an exception is when the vehicle 101 is positioned above the beacon. As a result, a signal strength for each of the codes can be relatively equal.

Figure 11:
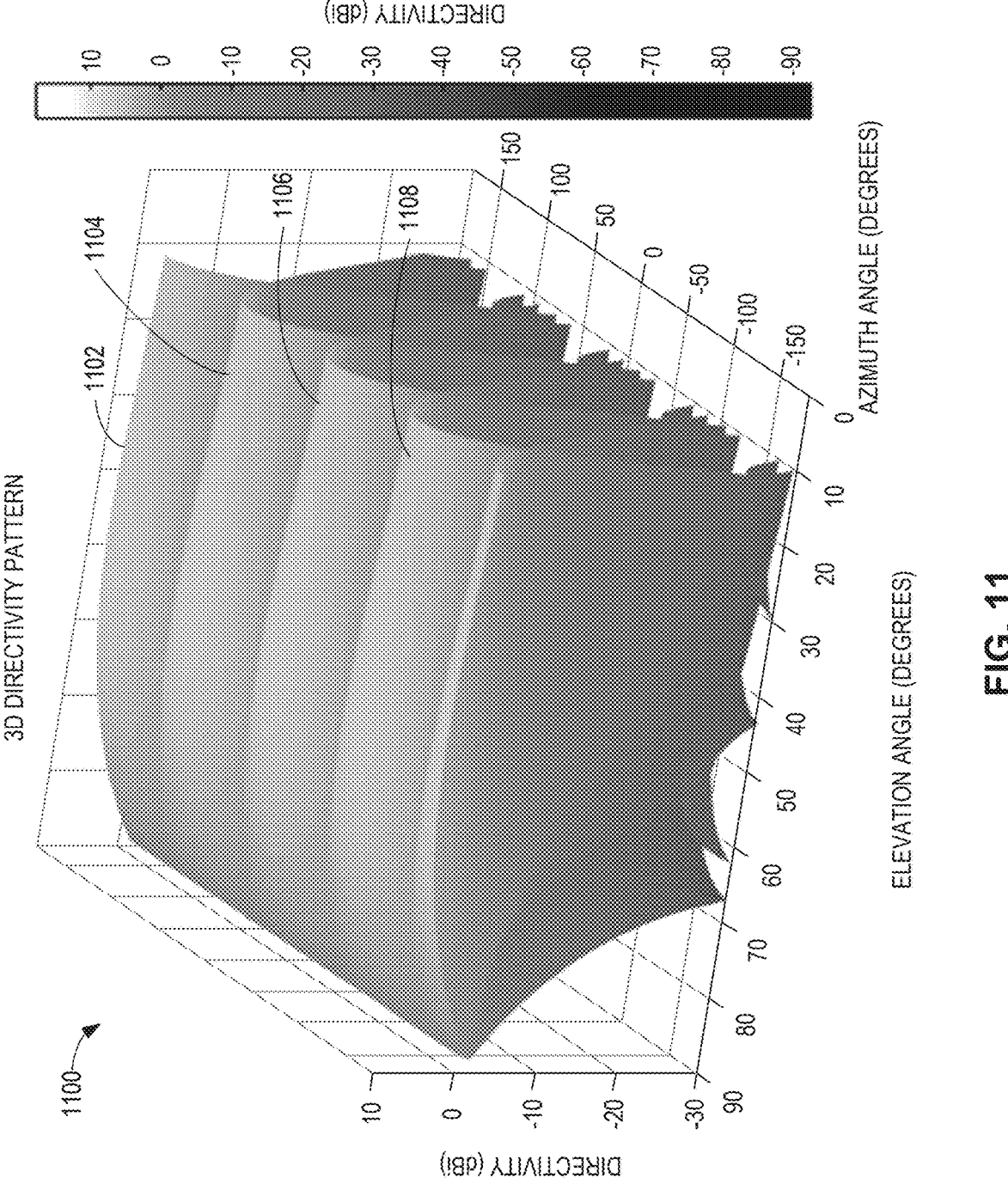
FIG. 11 illustrates an example directivity pattern that can be implemented in examples disclosed herein.

FIG. 11 illustrates an example directivity pattern that can be implemented in examples disclosed herein. In the illustrated view of FIG. 11, a graph 1100 is shown with four beams 1102, 1104, 1106, 1108 transmitted from a beacon having corresponding beam directivity. In this example, adjacent ones of the beams 1102, 1104, 1106, 1108 have generally equivalent amplitudes on 45 degree radials and each of the beams 1102, 1104, 1106, 1108 have generally equal amplitudes at a zenith. In some examples, a 4×4 array of circular patch elements is utilized.

In the example of FIG. 11, a three-dimensional view of the radiation patterns of the four-quadrant array discussed above is depicted. The four beams 1102, 1104, 1106, 1108 are oriented at 0, 90, 180 and 270 degrees in azimuth and each beam is pointed at 45 degrees from elevation, for example. It can be seen that a relatively equal amplitude for adjacent codes/beams 1102, 1104, 1106, 1108 will be received when the vehicle 101 is on the corresponding radials. It can also be seen that the amplitude of all the beams 1102, 1104, 1106, 1108 converges to a relatively same value. Further, as the vehicle 101 approaches a zenith, a similar level for all four signals 1102, 1104, 1106, 1108 is measured. Accordingly, a vertical estimate of the accuracy improves as the vehicle 101 approaches the zenith. In certain situations, only a maximum of two codes/beams are received at lower elevations and, thus, no vertical information can be obtained. Therefore, another strategy for using a beacon constructed in accordance with teachings of this disclosure is to acquire and/or identify a radial, and, in turn, follow the radial and begin seeking the other two codes. Once the codes are received, the receiver can then generate guidance such that the vehicle 101 is maneuvered into a position whereby all four signals are relatively equal. In some examples, if more than four sectors/beams are utilized, some subset of the beams from an opposite hemisphere of the patterns can be utilized so that the receiver only needs to track up to four codes for equalization of their received patterns.

Figure 12:
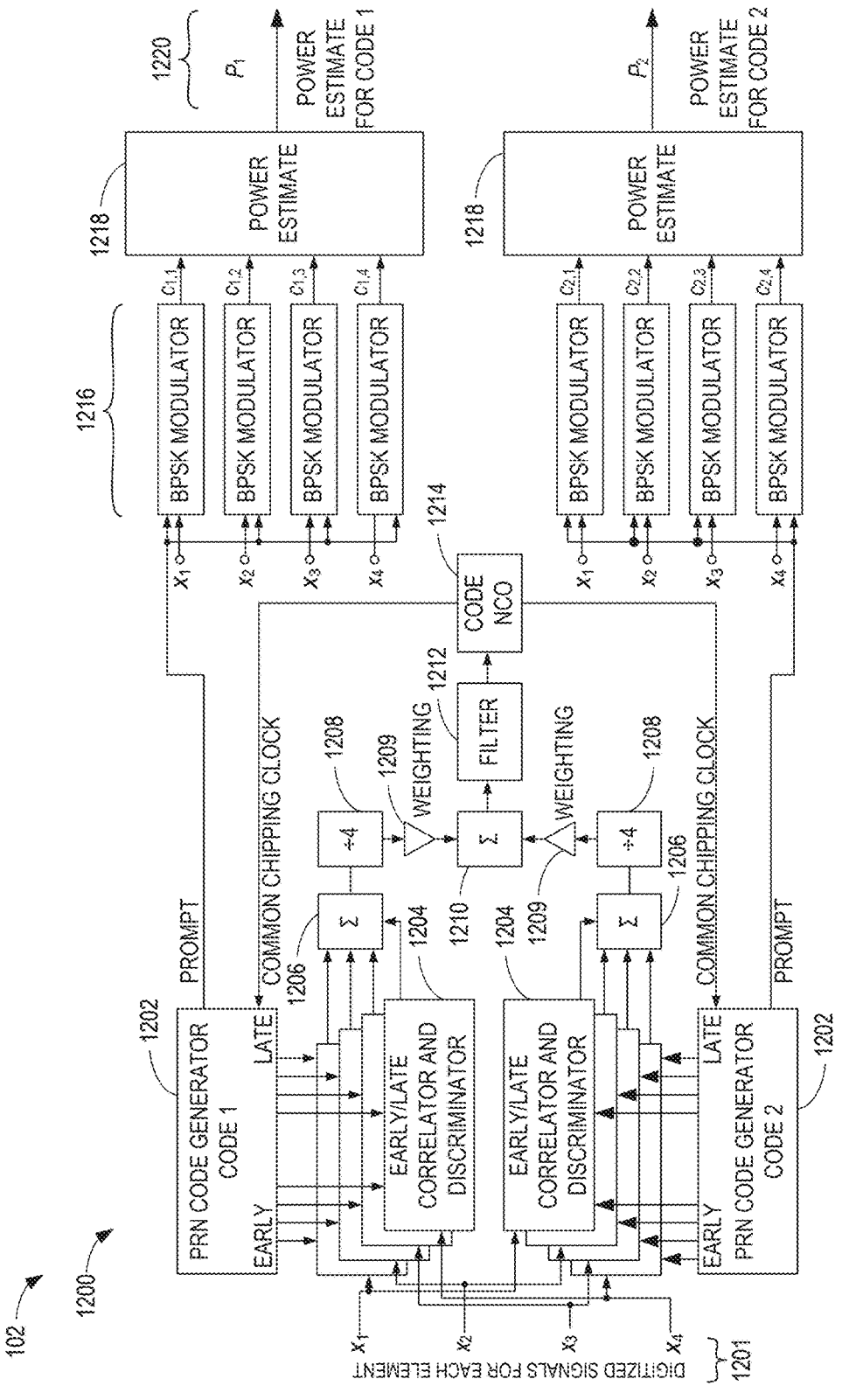
FIG. 12 is a schematic overview of an alternative example receiver processing in accordance with teachings of this disclosure.

FIG. 12 is a schematic overview of an alternative example receiver circuit 1200 in accordance with teachings of this disclosure. The example receiver circuit 1200 may be implemented in the receiver 102 shown in FIG. 1 and/or the software-defined radio 410 shown in FIG. 4. In the illustrated example of FIG. 12, the example receiver circuit 1200 is to receive digitized signal streams 1201 corresponding to each antenna element of the vehicle 101 shown in FIG. 1. The example receiver circuit 1200 includes PRN code generators 1202, discriminators 1204, summing devices 1206, dividers 1208, weights 1209, a summing device 1210, a filter 1212, a code NCO 1214, modulators 1216, which are implemented as BPSK modulators in this example, and power estimators 1218.

To determine a power estimate for each code of a carrier, recovered carriers from the modulators 1216 are provided to the power estimators 1218. In this example, a corresponding receiver is to track two to four different codes and estimate the relative received power between the two to four codes. Because all the codes are synchronized at the beacon, only a single code clock is required. In this example, individual signals on the individual elements are not tracked separately. Similar to the example of FIG. 5, a delay lock loop (DLL) for all four antennas is processed separately and the output of the discriminators 1204 is averaged over four channels. In particular, a similar process to the example of FIG. 5 is applied to each code as well as across four channels. To that end, discriminator weightings for two of the channels are weighted in accordance with the estimated C/No of each code and summed together so they will drive a single code NCO 1214. The example PRN generators 1202 are driven by an identical clock signal from the code NCO 1214. In this example, because all of the codes are synchronized, only one code is to be acquired and the appropriate synchronization for the other codes is, thus, known immediately. The power of all of the antennas contributes to the code delay lock loop (DLL) tracking. In turn, prompt PRN codes for from each of the PRN generators 1202 is used to de-spread the signals and recover carriers 1220. This aspect of processing is common with the DoA estimation. However, for the multi-sectional beacon tracking, the recovered, de-spread and/or recovered carriers 1220 are provided to the power estimation algorithm and/or the power estimator 1218 to produce an estimate of the power for each coded signal. However, many well-known techniques are available for estimating the power in a signal. In the illustrated example, power estimates corresponding to the codes are compared and used to derive information about the orientation of the vehicle 101 to the beacon.

Examples disclosed herein can enable a relatively simple acquisition in which only a single code is searched for. This can be done in a variety of well known techniques, such as, but not limited to, a sequential delay, doppler bin search through a block processing technique, such as computation of the Complex Ambiguity Function (CAF), etc. Once the acquisition algorithm finds the appropriate code phase and doppler frequency, the code and carrier tracking loops can be initialized and they will pull in to accurately track a code and a carrier for an incoming signal. All the code phases of multiple PRN signals from the ground are synchronized. Accordingly, knowing a correct phase for one signal enables immediate demodulation/dispreading of the other codes.

In this example, the receiver implementation is more complex, but much of the processing is on a similar scale to the example of FIG. 5, but replicated N times, where N is the maximum number of codes to be tracked.

According to examples disclosed herein, computations can be performed as follows: 1.) A receiver measures/estimates $\hat{n}_1$, a unit vector from an antenna of a vehicle to a beacon based on direction of arrival measurements. Because the antenna is installed with a fixed and known orientation with respect to the aircraft reference frame, the vector $\hat{n}_1$ can easily be translated to the aircraft reference frame; 2.) The receiver measures/estimates $\hat{n}_2$, a unit vector in a beacon reference frame (BRF) pointing from the beacon to the vehicle based on relative signal strengths in the codes received by the multi-sector beacon; 3.) The pitch roll and heading of the vehicle is provided by external systems and utilized to compute a transformation matrix $T_{AC \rightarrow BRF}$, which transforms from the vehicle reference frame to the beacon reference frame; 4.) The receiver computes: $\hat{n}_{ba1} = -\hat{n}_1 T_{AC \rightarrow BRF}$, which is the measured vector from the antenna of the vehicle to the ground-based beacon transformed to the beacon reference frame. Accordingly, a unit vector from the beacon to the aircraft in the beacon reference frame is determined; 5.) The receiver computes $\hat{n}_{ba}$ as a weighed average of $\hat{n}_{ba1}$ and $\hat{n}_2$, according to the expected relative accuracy of the measurements. For example, as low elevation angles, a vertical component of $\hat{n}_2$ may be of relatively low accuracy or non-existent, so the vertical component of $\hat{n}_{ba}$ can essentially be the vertical component of $\hat{n}_{ba1}$; and 6.) Having acquired a best estimate of $\hat{n}_{ba}$, the step to compute the position in the beacon reference frame can be identical to steps corresponding to Equations 1 to 7 described above in connection with FIG. 7.

Figure 13:
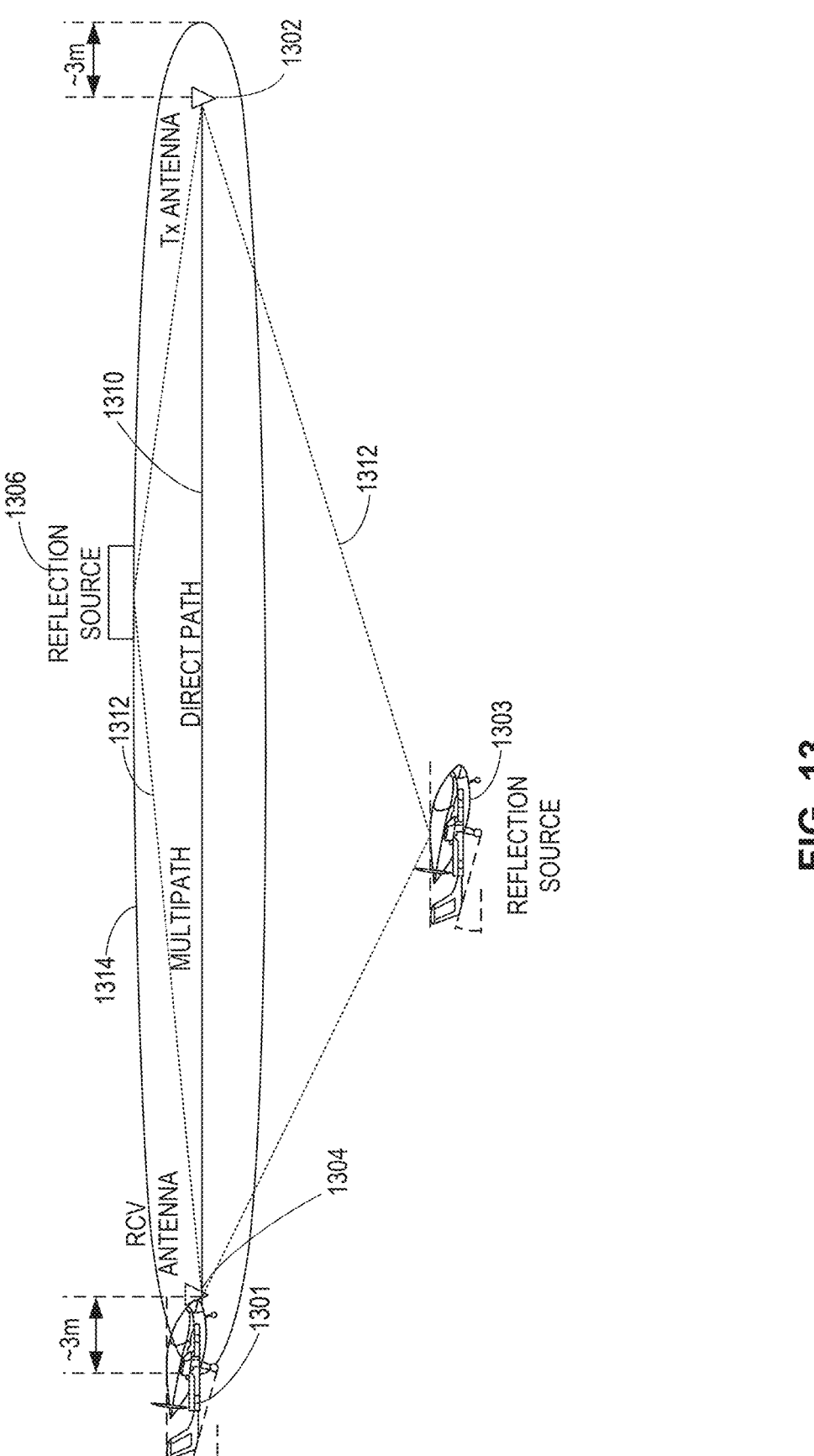
FIG. 13 illustrates example multipath control that can be implemented in examples disclosed herein.

FIG. 13 illustrates example multipath control that can be implemented in examples disclosed herein. In the illustrated example of FIG. 13, a vehicle 1301 is receiving a signal from an antenna 1302 of a beacon. In particular, the vehicle 1301 includes a receiving antenna 1304 to receive at least one signal from the antenna 1302. In this example, a reflection source 1303 and a reflection source 1306 are also shown. Further, a direct path 1310 and a multipath 1312 are shown. In this example, a region 1314 depicts a Fresnel zone that defines a volume where reflections will have less than some specified differential path delay. Hence, reflecting sources inside the Fresnel zone 1314 will result in multipath signals that will not be eliminated by the dispreading of the DSSS signal. Multipath signals from objects outside the Fresnel zone 1314 will be eliminated by the dispreading of the DSSS signal. Direction of arrival measurements made at the aircraft 1301 depend on the relative phase of the signal received at the elements in the receive antenna array 1304. Multipath signals will mix with the direct path signals and cause errors in the determination of the direction of arrival of the signals. Hence, multipath should be eliminated to the largest extent possible to ensure accurate determination of the DoA of the signal. The Fresnel zone must be protected in the sense that multipath sources should not be present within the Fresnel zone throughout the operation of the approach.

Multipath from the structure of the vehicle 1301 can be an issue, but may be mitigated by antenna placement and directivity.

Figures 14A, 14B, 14C:
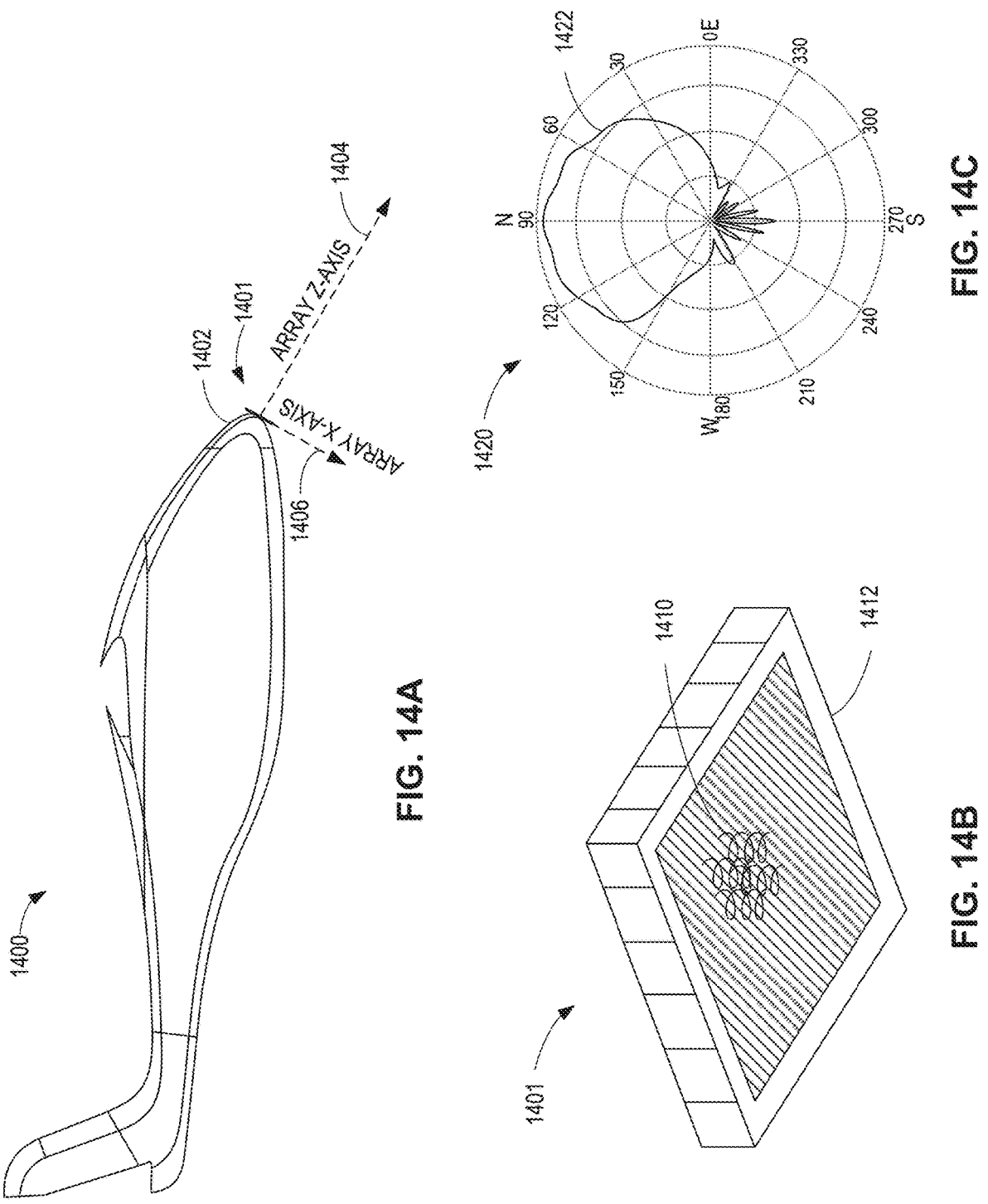
FIGS. 14A-14C illustrate an example antenna configura-tion that can be implemented in examples disclosed herein.

FIGS. 14A-14C illustrate an example antenna configuration that can be implemented in examples disclosed herein. Turning to FIG. 14A, in this example, a vehicle (e.g., an aircraft, an unmanned or manned aerial vehicle, etc.) 1400 includes an antenna array 1401 mounted on a nose portion 1402 of the vehicle 1400. The antenna array 1401 includes a corresponding coordinate system with coordinate axes 1404, 1406. The array is situated so that all the structure of the aircraft is situation behind the array (e.g., below the horizon of the ground plane in the antenna reference frame).

FIG. 14B depicts a detailed view of a hypothetical representative antenna array 1401 having four elements that are three-turn helixes 1410 spaced in a rectangular pattern on a ground plane or body 1412. According to some examples disclosed herein, assuming a wave length of approximately 5.9 centimeters (cm) and accounting for effects of the ground plane, the array 1401 with the ground plane can be between approximately 10 centimeters (cm) to 15 cm in size (e.g., a width, a height, etc.). Such an array could be housed inside a ray dome to provide improved aerodynamic performance.

FIG. 14C depicts an example graph 1420 depicting example directivity of an example antenna element (i.e. a spiral or helix) used in the array 1401. In this example, a contour 1422 corresponds to an azimuth angle cut of 90 degrees across all elevation angles in the antenna reference frame. Multipath from an airframe will come in from below the x-y plane and should be at least 20 dB lower than signals coming from within the field of view defined by 45 degrees to 135 degrees elevation. Consequently, any airframe multipath signals will be at least 20 dB below direct signals received from the beacon within the field of view.

Figure 15:
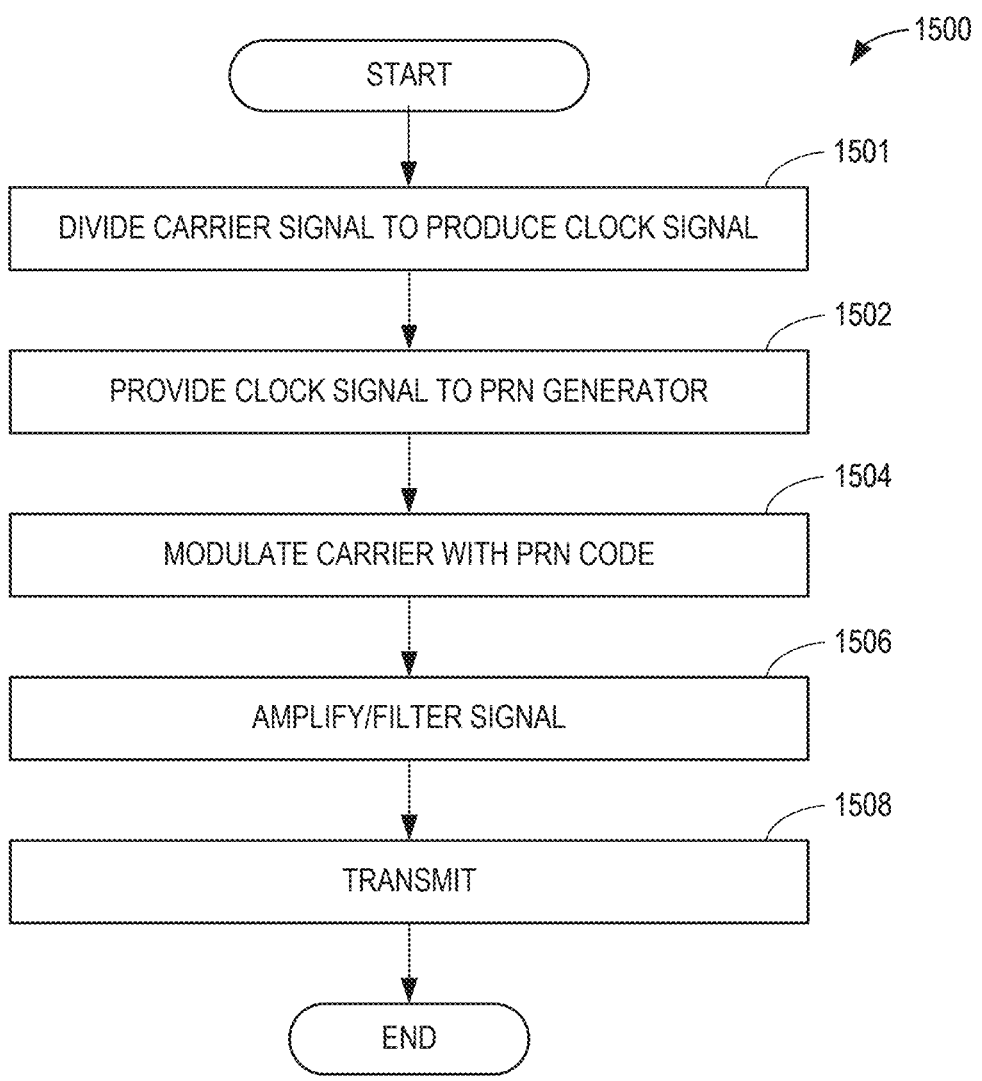
FIG. 15 is a flowchart representative of an example method to operate a beacon in accordance with teachings of this disclosure.

FIG. 15 is a flowchart representative of an example method 1500 to operate a beacon (e.g., the beacon 110) in accordance with teachings of this disclosure. The example method 1500 is implemented to transmit at least one signal from the beacon for guidance of the vehicle 101.

At block 1501, a carrier signal is divided to produce a clock signal. In some examples, a carrier frequency is divided by 100 to produce a PRN code or a chip clock (or chipping rate clock).

At block 1502, a clock signal is provided to a PRN code generator (e.g., the PRN code generator 306, the PRN code generator 904). In this example, the clock signal is provided to the PRN code generator from a chipping clock (e.g., the chipping clock 304, the chipping clock 902).

At block 1504, a carrier of a signal is modulated with the aforementioned PRN code via a modulator (e.g., the modulator 308, the modulator(s) 908).

At block 1506, the signal is amplified and filtered.

At block 1508, the signal is transmitted via an antenna and/or an antenna array and the process ends. In some examples, multiple ones of the signals are transmitted (e.g., via beam forming).

Figure 16:
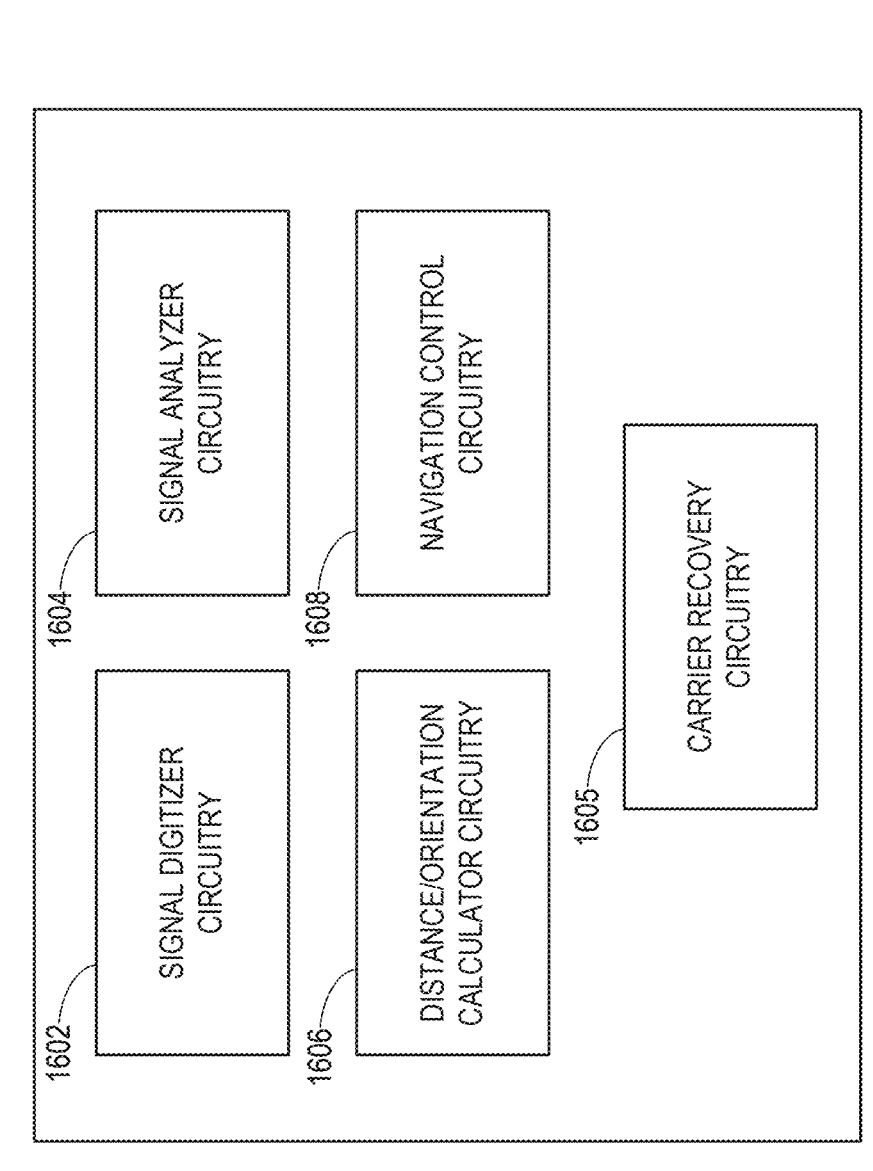
FIG. 16 is a block diagram of an example receiver analysis system in accordance with teachings of this disclo-sure.

FIG. 16 is a block diagram of an example receiver analysis system 1600 of the receiver 102 of FIG. 1 to recover carrier signals for guidance of a vehicle (e.g., the vehicle 101). The example receiver analysis system 1600 of FIG. 16 may be instantiated (e.g., creating an instance of, bring into being for any length of time, materialize, implement, etc.) by programmable circuitry such as a Central Processor Unit (CPU) executing first instructions. Additionally or alternatively, the example receiver analysis system 1600 of FIG. 16 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 16 may, thus, be instantiated at the same or different times. Some or all of the circuitry of FIG. 16 may be instantiated, for example, in one or more threads executing concurrently on hardware and/or in series on hardware. Moreover, in some examples, some or all of the circuitry of FIG. 16 may be implemented by microprocessor circuitry executing instructions and/or FPGA circuitry performing operations to implement one or more virtual machines and/or containers.

The example receiver analysis system 1600 includes example signal digitizer circuitry 1602, example signal analyzer circuitry 1604, example carrier recovery circuitry 1605, example distance/orientation calculator circuitry 1606, and example navigation control circuitry 1608.

In the illustrated example of FIG. 16, the example signal digitizer circuitry 1602 is implemented to digitize at least one signal received from a beacon (e.g., the beacon 110) into digitized signals and/or digital data streams corresponding to respective antenna elements. In the illustrated example, the example signal digitizer circuitry 1602 digitizes the signals from the beacon to define and/or generate I and Q samples thereof. According to examples disclosed herein, the signals are amplified and downconverted. In some examples, the signal digitizer circuitry 1602 is instantiated by programmable circuitry executing signal digitizer instructions and/or configured to perform operations such as those represented by the flowchart of FIG. 17.

The example signal analyzer circuitry 1604 is implemented to perform a delay lock loop such that signals are multiplied by locally generated copies of code with an early and late offset by a defined fraction of a chip. The example signal analyzer circuitry 1604 can utilize at least one discriminator in conjunction with an integrator (e.g., an integrate and dump block). In this example, at least one error of the signals is utilized for recovery of the carrier signals. In some such examples, the errors are averaged for recovery of the carrier signal. Additionally or alternatively, the signals and/or errors are weighted. In some examples, the signal analyzer circuitry 1604 is instantiated by programmable circuitry executing signal analyzer instructions and/or configured to perform operations such as those represented by the flowchart of FIG. 17.

The example carrier recovery circuitry 1605 recovers carriers from the signals via at least one modulator, such as a BPSK modulator, for example. In the illustrated example of FIG. 16, each of the signals for each antenna element is modulated with the at least one modulator to recover the carriers. In some examples, the recovered carriers are utilized to determine a power of a signal. In some examples, the carrier recovery circuitry 1605 is instantiated by programmable circuitry executing carrier recovery instructions and/or configured to perform operations such as those represented by the flowchart of FIG. 17.

The distance/orientation calculator circuitry 1606 of the illustrated example determines a direction of arrival of the vehicle (with respect to the beacon) based on the recovered carriers. Additionally or alternatively, the recovered carriers are utilized to determine an elevation and heading of the vehicle. In some examples, the distance/orientation calculator circuitry 1606 determines a position of the vehicle in a beacon reference frame. In some examples, the distance/orientation calculator circuitry 1606 is instantiated by programmable circuitry executing distance/orientation calculator instructions and/or configured to perform operations such as those represented by the flowchart of FIG. 17.

The navigation control circuitry 1608 of the illustrated example is implemented to control and/or direct the vehicle based on the direction of arrival. In some examples, the vehicle is guided toward the beacon based on the direction of arrival and then caused to descend (e.g., vertically descend) toward the beacon. In some examples, the navigation control circuitry 1608 is instantiated by programmable circuitry executing navigation control instructions and/or configured to perform operations such as those represented by the flowchart of FIG. 17.

While an example manner of implementing the example receiver analysis system 1600 of FIG. 16 is illustrated in FIG. 16, one or more of the elements, processes, and/or devices illustrated in FIG. 16 may be combined, divided, re-arranged, omitted, eliminated, and/or implemented in any other way. Further, the example signal digitizer circuitry 1602, the example signal analyzer circuitry 1604, the example carrier recovery circuitry 1605, the example distance/orientation calculator circuitry 1606, the example navigation control circuitry 1608, and/or, more generally, the example receiver analysis system 1600 of FIG. 16, may be implemented by hardware alone or by hardware in combination with software and/or firmware. Thus, for example, any of the example signal digitizer circuitry 1602, the example signal analyzer circuitry 1604, the example carrier recovery circuitry 1605, the example distance/orientation calculator circuitry 1606, the example navigation control circuitry 1608, and/or, more generally, the example receiver analysis system 1600, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example receiver analysis system 1600 of FIG. 16 may include one or more elements, processes, and/or devices in addition to, or instead of, those illustrated in FIG. 16, and/or may include more than one of any or all of the illustrated elements, processes and devices.

Figure 17:
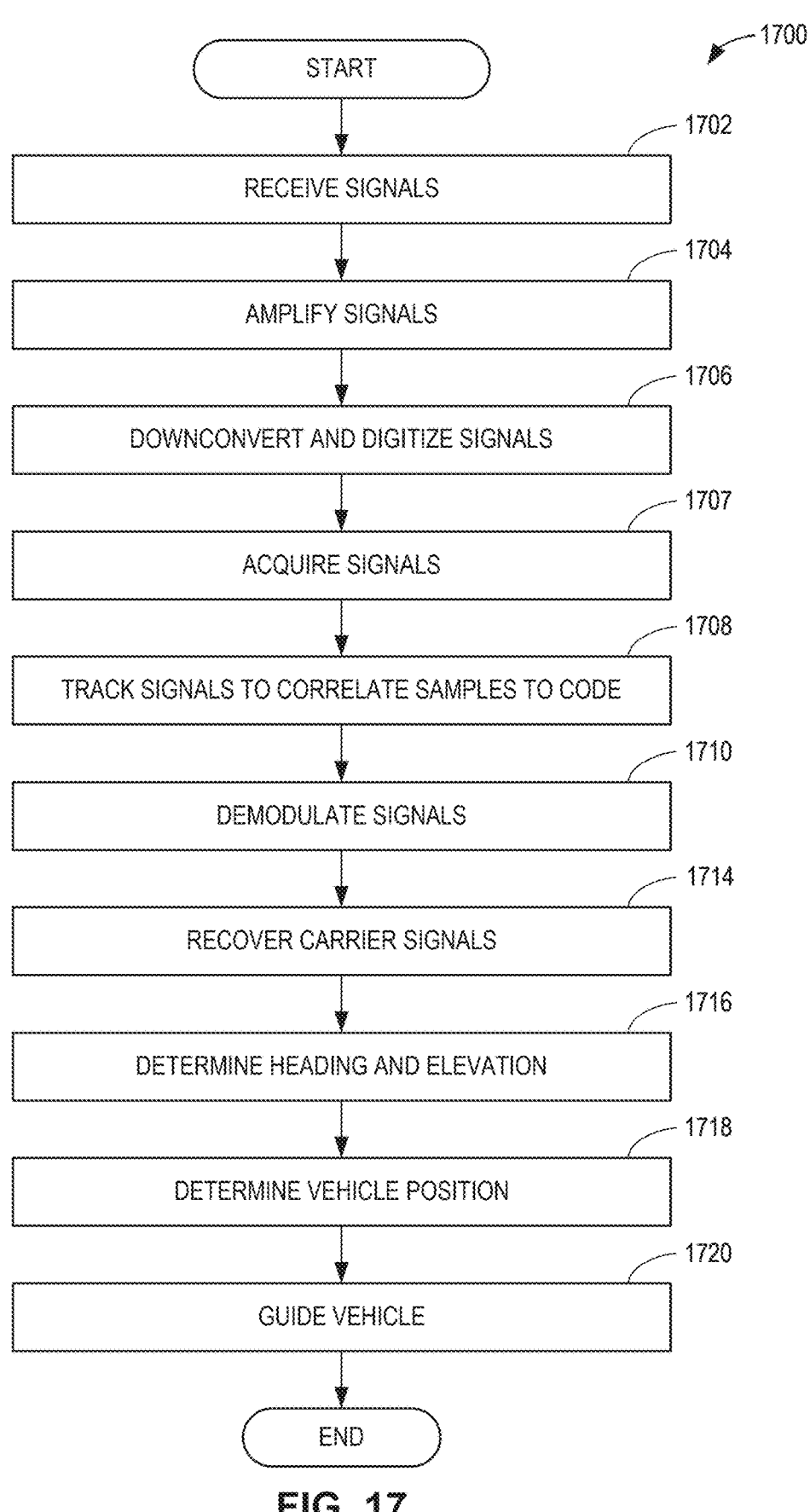
FIG. 17 is a flowchart representative of example machine readable instructions and/or example operations that may be executed, instantiated, and/or performed by example pro-grammable circuitry to implement the receiver 102 of FIG. 16.

A flowchart representative of example machine readable instructions, which may be executed by programmable circuitry to implement and/or instantiate the example receiver analysis system 1600 of FIG. 16 and/or representative of example operations which may be performed by programmable circuitry to implement and/or instantiate the example receiver analysis system 1600 of FIG. 16, is shown in FIG. 17. The machine readable instructions may be one or more executable programs or portion(s) of one or more executable programs for execution by programmable circuitry such as the programmable circuitry 1812 shown in the example processor platform 1800 discussed below in connection with FIG. 18 and/or may be one or more function(s) or portion(s) of functions to be performed by the example programmable circuitry (e.g., an FPGA) discussed below in connection with FIGS. 19 and/or 20. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 17, many other methods of implementing the example receiver analysis system 1600 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 17 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 17 is a flowchart representative of example machine readable instructions and/or example operations 1700 that may be executed, instantiated, and/or performed by programmable circuitry to recover carriers from signals for guidance of a vehicle (e.g., the vehicle 101). The example machine-readable instructions and/or the example operations 1700 of FIG. 17 begin at block 1702, at which the example signal analyzer 1604 receives signals received and/or acquired at elements of an antenna array of a vehicle transmitted from a beacon (e.g., the beacon 110) in a landing area.

At block 1704, the example signal digitizer circuitry 1602 and/or the example signal analyzer circuitry 1604 causes the signals to be amplified. In this example, each of the signals is amplified with a low noise amplifier.

At block 1706, the example signal digitizer circuitry 1602 downconverts and digitizes the signals. As a result, digital streams of each signal that define I and Q samples are generated.

At block 1707, the example signal analyzer circuitry 1604 acquires the signals. According to examples disclosed herein, the signals are correlated against a locally generated PRN code.

At block 1708, the example signal digitizer circuitry 1606 tracks the signals to correlate the signals to the locally generated PRN code. In particular, the I and Q samples are correlated to the locally generated PRN code and a delay lock loop (DLL) is used to synchronize the incoming PRN coded signals with the PRN code replica generated in the airborne receiver.

At block 1710, the example carrier recovery circuitry 1605 causes the signals to be demodulated with a modulator. In particular, the signals are demodulated by utilizing a delay lock loop synchronized replica of the code.

At block 1714, the example carrier recovery circuitry 1605 recovers carrier signals. In some examples, the carrier signals are utilized to determine a unit vector (e.g., a directional unit vector in the vehicle reference frame) from the vehicle to the beacon.

At block 1716, the example distance/orientation calculator circuitry 1606 determines the azimuth and an elevation of the arrival of the beacon signal relative to the vehicle frame. Additionally or alternatively, the distance/orientation calculator circuitry 1606 determines a direction of arrival of the beacon signal at the antenna array on the vehicle. In some examples, the distance/orientation calculator circuitry 1606 determines a vector (e.g., a unit vector) pointing from the airborne antenna array to the beacon location.

At block 1718, in some examples, the distance/orientation calculator circuitry 1606 determines a position and/or relative position of the vehicle. In some such examples, the distance/orientation calculator circuitry 1606 can determine a position of the vehicle in a beacon reference frame.

At block 1720, in some examples, the navigation control circuitry 1608 guides the vehicle toward the beacon, and the process ends. In some such examples, the navigation control circuitry 1608 can utilize the direction of arrival to guide the vehicle. In a particular example, the vehicle is guided to a position above the beacon and caused to descend at the position.

Figure 18:
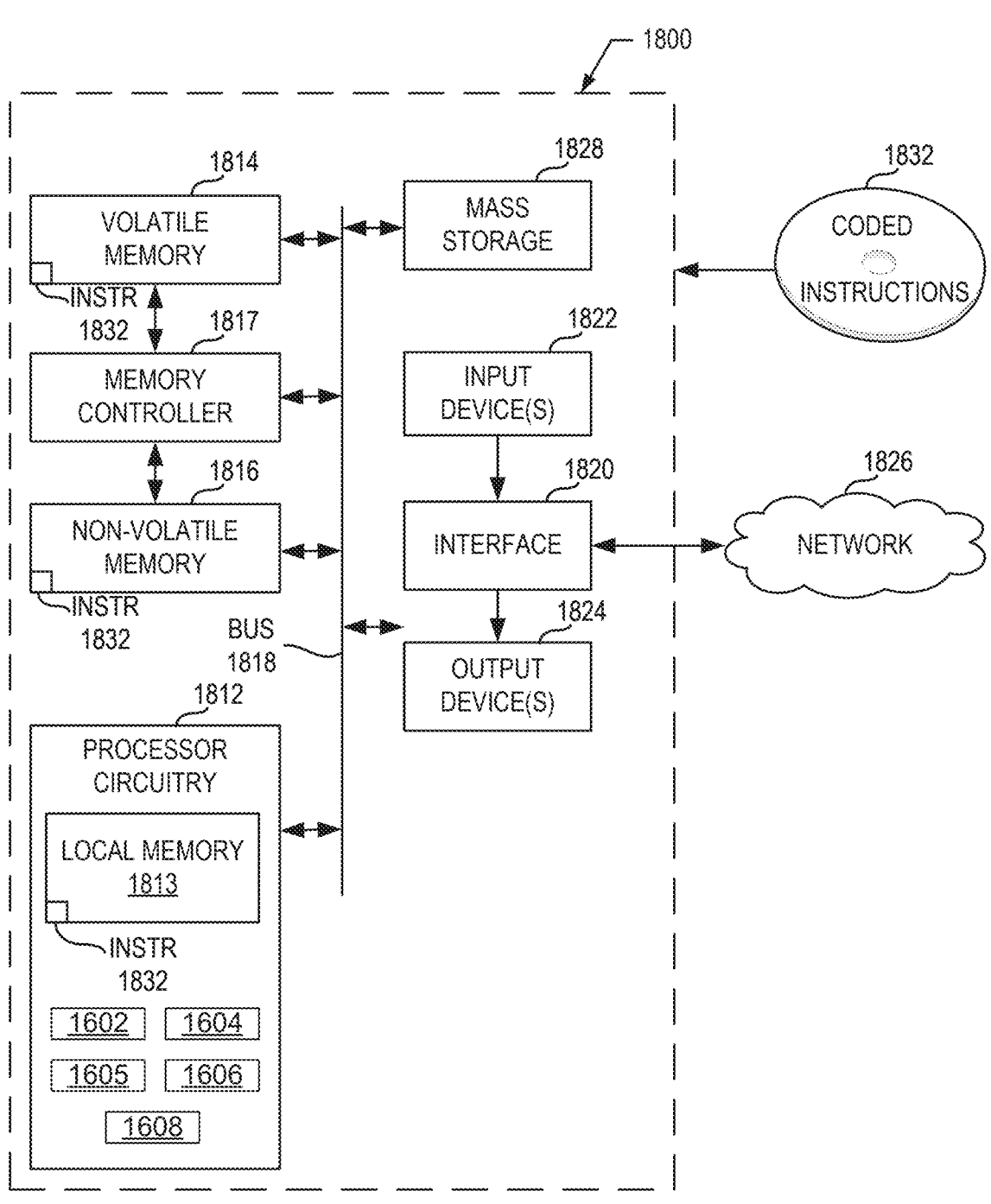
FIG. 18 is a block diagram of an example processing platform including programmable circuitry structured to execute, instantiate, and/or perform the example machine readable instructions and/or perform the example operations of FIG. 17 to implement the receiver 102 of FIG. 16.

FIG. 18 is a block diagram of an example programmable circuitry platform 1800 structured to execute and/or instantiate the example machine-readable instructions and/or the example operations of FIG. 17 to implement the example receiver analysis system 1600 of FIG. 16. The programmable circuitry platform 1800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1800 of the illustrated example includes programmable circuitry 1812. The programmable circuitry 1812 of the illustrated example is hardware. For example, the programmable circuitry 1812 can be implemented by one or more integrated circuits, logic circuits, FPGAs, microprocessors, CPUs, GPUs, DSPs, and/or microcontrollers from any desired family or manufacturer. The programmable circuitry 1812 may be implemented by one or more semiconductor based (e.g., silicon based) devices. In this example, the programmable circuitry 1812 implements the example signal digitizer circuitry 1602, the example signal analyzer circuitry 1604, the example carrier recovery circuitry 1605, the example distance/orientation calculator circuitry 1606, and the example navigation control circuitry 1608.

The programmable circuitry 1812 of the illustrated example includes a local memory 1813 (e.g., a cache, registers, etc.). The programmable circuitry 1812 of the illustrated example is in communication with main memory 1814, 1816, which includes a volatile memory 1814 and a non-volatile memory 1816, by a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1816 may be implemented by flash memory and/or any other desired type of memory device. Access to the main memory 1814, 1816 of the illustrated example is controlled by a memory controller 1817. In some examples, the memory controller 1817 may be implemented by one or more integrated circuits, logic circuits, microcontrollers from any desired family or manufacturer, or any other type of circuitry to manage the flow of data going to and from the main memory 1814, 1816.

The programmable circuitry platform 1800 of the illustrated example also includes interface circuitry 1820. The interface circuitry 1820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1822 are connected to the interface circuitry 1820. The input device(s) 1822 permit(s) a user (e.g., a human user, a machine user, etc.) to enter data and/or commands into the programmable circuitry 1812. The input device(s) 1822 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1824 are also connected to the interface circuitry 1820 of the illustrated example. The output device(s) 1824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1820 of the illustrated example, thus, typically includes a graphics driver card, a graphics driver chip, and/or graphics processor circuitry such as a GPU.

The interface circuitry 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1800 of the illustrated example also includes one or more mass storage discs or devices 1828 to store firmware, software, and/or data. Examples of such mass storage discs or devices 1828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1832, which may be implemented by the machine readable instructions of FIG. 17, may be stored in the mass storage device 1828, in the volatile memory 1814, in the non-volatile memory 1816, and/or on at least one non-transitory computer readable storage medium such as a CD or DVD which may be removable.

Figure 19:
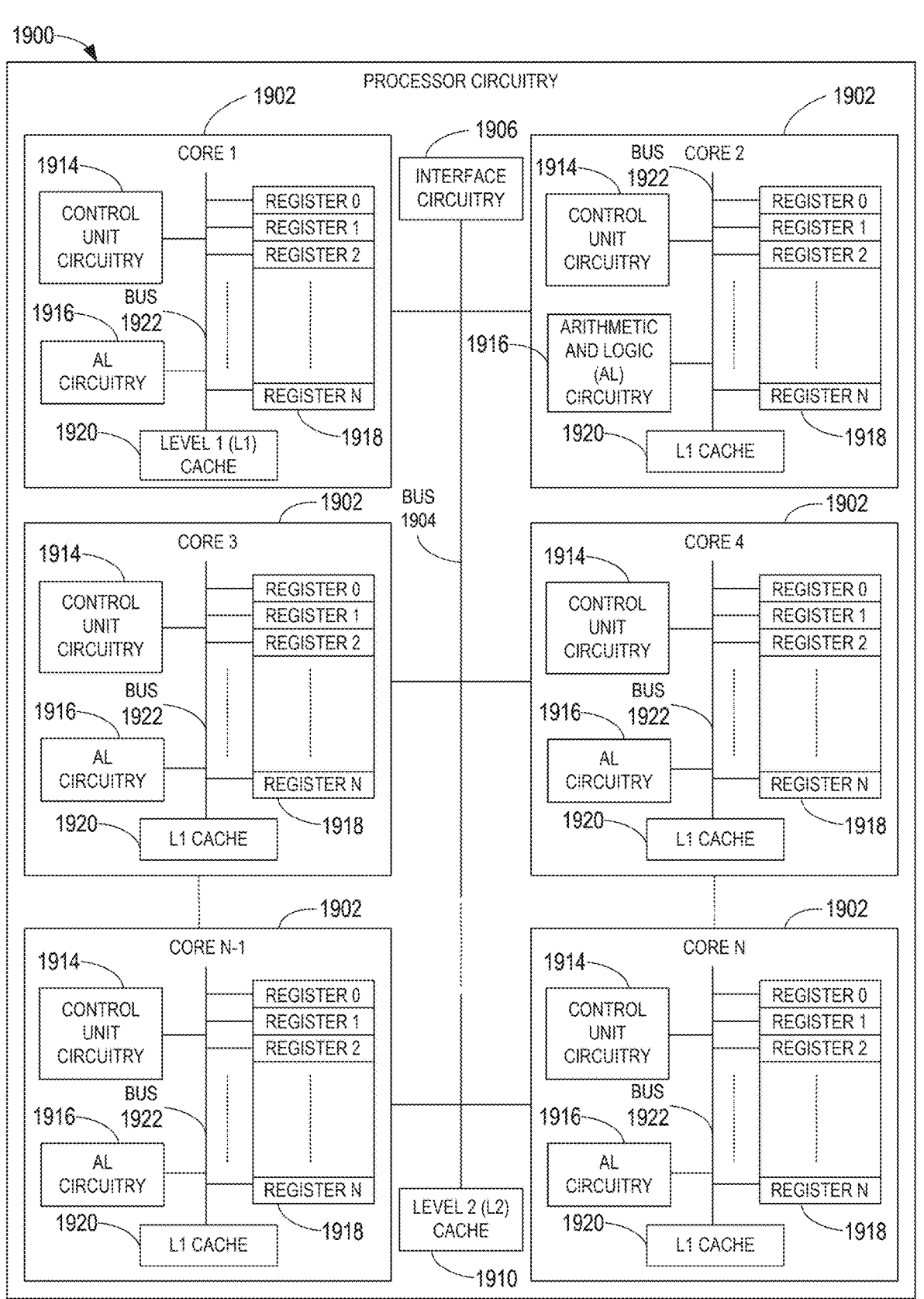
FIG. 19 is a block diagram of an example implementation of the programmable circuitry of FIG. 18.

FIG. 19 is a block diagram of an example implementation of the programmable circuitry 1812 of FIG. 18. In this example, the programmable circuitry 1812 of FIG. 18 is implemented by a microprocessor 1900. For example, the microprocessor 1900 may be a general-purpose microprocessor (e.g., general-purpose microprocessor circuitry). The microprocessor 1900 executes some or all of the machine-readable instructions of the flowchart of FIG. 17 to effectively instantiate the circuitry of FIG. 16 as logic circuits to perform operations corresponding to those machine readable instructions. In some such examples, the circuitry of FIG. 16 is instantiated by the hardware circuits of the microprocessor 1900 in combination with the machine-readable instructions. For example, the microprocessor 1900 may be implemented by multi-core hardware circuitry such as a CPU, a DSP, a GPU, an XPU, etc. Although it may include any number of example cores 1902 (e.g., 1 core), the microprocessor 1900 of this example is a multi-core semiconductor device including N cores. The cores 1902 of the microprocessor 1900 may operate independently or may cooperate to execute machine readable instructions. For example, machine code corresponding to a firmware program, an embedded software program, or a software program may be executed by one of the cores 1902 or may be executed by multiple ones of the cores 1902 at the same or different times. In some examples, the machine code corresponding to the firmware program, the embedded software program, or the software program is split into threads and executed in parallel by two or more of the cores 1902. The software program may correspond to a portion or all of the machine readable instructions and/or operations represented by the flowchart of FIG. 17.

The cores 1902 may communicate by a first example bus 1904. In some examples, the first bus 1904 may be implemented by a communication bus to effectuate communication associated with one(s) of the cores 1902. For example, the first bus 1904 may be implemented by at least one of an Inter-Integrated Circuit (I2C) bus, a Serial Peripheral Interface (SPI) bus, a PCI bus, or a PCIe bus. Additionally or alternatively, the first bus 1904 may be implemented by any other type of computing or electrical bus. The cores 1902 may obtain data, instructions, and/or signals from one or more external devices by example interface circuitry 1906. The cores 1902 may output data, instructions, and/or signals to the one or more external devices by the interface circuitry 1906. Although the cores 1902 of this example include example local memory 1920 (e.g., Level 1 (L1) cache that may be split into an L1 data cache and an L1 instruction cache), the microprocessor 1900 also includes example shared memory 1910 that may be shared by the cores (e.g., Level 2 (L2 cache)) for high-speed access to data and/or instructions. Data and/or instructions may be transferred (e.g., shared) by writing to and/or reading from the shared memory 1910. The local memory 1920 of each of the cores 1902 and the shared memory 1910 may be part of a hierarchy of storage devices including multiple levels of cache memory and the main memory (e.g., the main memory 1814, 1816 of FIG. 18). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1902 may be referred to as a CPU, DSP, GPU, etc., or any other type of hardware circuitry. Each core 1902 includes control unit circuitry 1914, arithmetic and logic (AL) circuitry (sometimes referred to as an ALU) 1916, a plurality of registers 1918, the local memory 1920, and a second example bus 1922. Other structures may be present. For example, each core 1902 may include vector unit circuitry, single instruction multiple data (SIMD) unit circuitry, load/store unit (LSU) circuitry, branch/jump unit circuitry, floating-point unit (FPU) circuitry, etc. The control unit circuitry 1914 includes semiconductor-based circuits structured to control (e.g., coordinate) data movement within the corresponding core 1902. The AL circuitry 1916 includes semiconductor-based circuits structured to perform one or more mathematic and/or logic operations on the data within the corresponding core 1902. The AL circuitry 1916 of some examples performs integer based operations. In other examples, the AL circuitry 1916 also performs floating-point operations. In yet other examples, the AL circuitry 1916 may include first AL circuitry that performs integer-based operations and second AL circuitry that performs floating-point operations. In some examples, the AL circuitry 1916 may be referred to as an Arithmetic Logic Unit (ALU).

The registers 1918 are semiconductor-based structures to store data and/or instructions such as results of one or more of the operations performed by the AL circuitry 1916 of the corresponding core 1902. For example, the registers 1918 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1918 may be arranged in a bank as shown in FIG. 19. Alternatively, the registers 1918 may be organized in any other arrangement, format, or structure, such as by being distributed throughout the core 1902 to shorten access time. The second bus 1922 may be implemented by at least one of an I2C bus, a SPI bus, a PCI bus, or a PCIe bus.

Each core 1902 and/or, more generally, the microprocessor 1900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1900 is a semiconductor device fabricated to include many transistors interconnected to implement the structures described above in one or more integrated circuits (ICs) contained in one or more packages.

The microprocessor 1900 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1900, in the same chip package as the microprocessor 1900 and/or in one or more separate packages from the microprocessor 1900.

Figure 20:
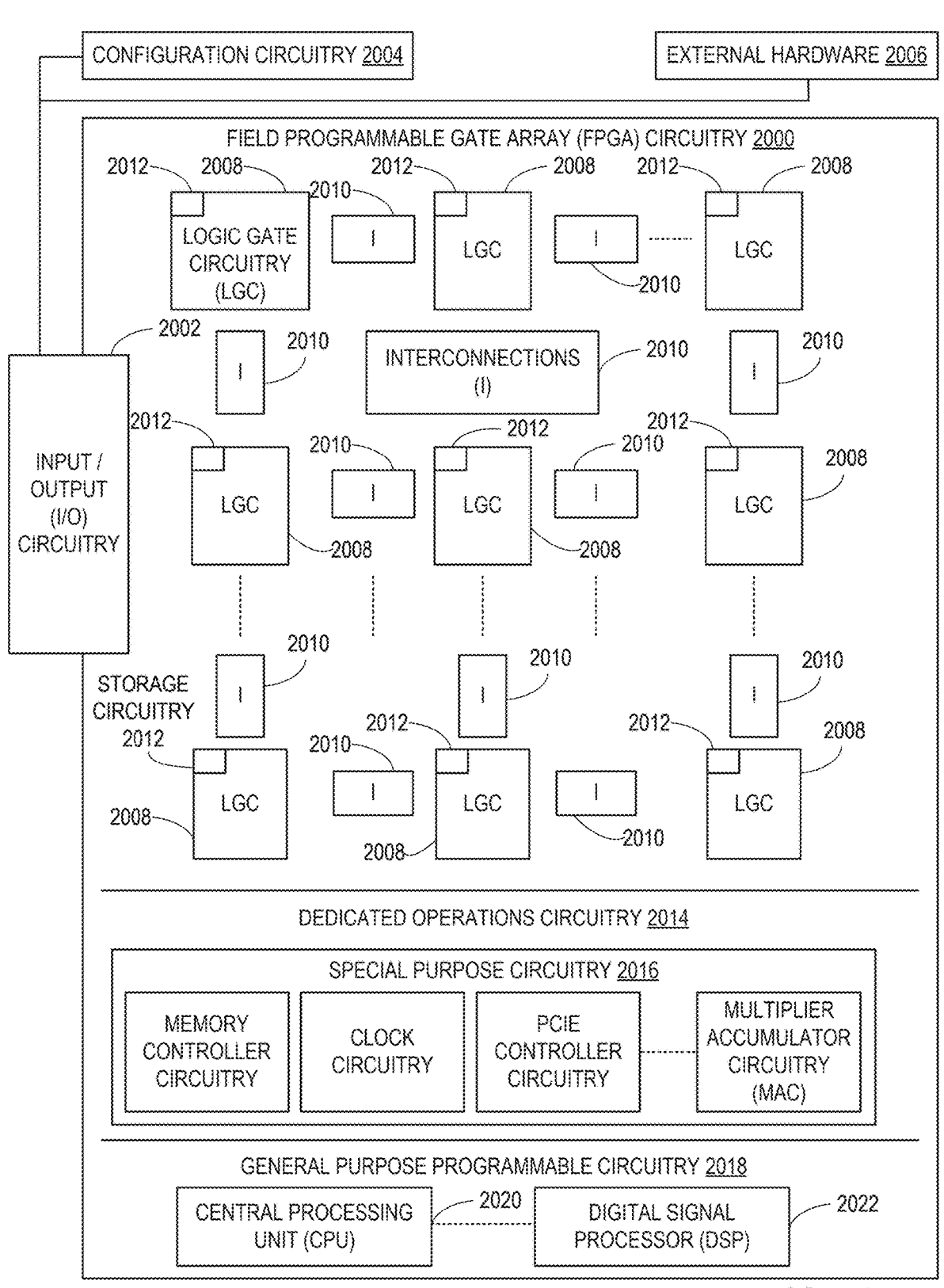
FIG. 20 is a block diagram of another example imple-mentation of the programmable circuitry of FIG. 18.

FIG. 20 is a block diagram of another example implementation of the programmable circuitry 1812 of FIG. 18. In this example, the programmable circuitry 1812 is implemented by FPGA circuitry 2000. For example, the FPGA circuitry 2000 may be implemented by an FPGA. The FPGA circuitry 2000 can be used, for example, to perform operations that could otherwise be performed by the example microprocessor 1900 of FIG. 19 executing corresponding machine readable instructions. However, once configured, the FPGA circuitry 2000 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1900 of FIG. 19 described above (which is a general purpose device that may be programmed to execute some or all of the machine readable instructions represented by the flowchart of FIG. 17 but whose interconnections and logic circuitry are fixed once fabricated), the FPGA circuitry 2000 of the example of FIG. 20 includes interconnections and logic circuitry that may be configured, structured, programmed, and/or interconnected in different ways after fabrication to instantiate, for example, some or all of the operations/functions corresponding to the machine readable instructions represented by the flowchart of FIG. 17. In particular, the FPGA circuitry 2000 may be thought of as an array of logic gates, interconnections, and switches. The switches can be programmed to change how the logic gates are interconnected by the interconnections, effectively forming one or more dedicated logic circuits (unless and until the FPGA circuitry 2000 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 17. As such, the FPGA circuitry 2000 may be configured and/or structured to effectively instantiate some or all of the operations/functions corresponding to the machine readable instructions of the flowchart of FIG. 17 as dedicated logic circuits to perform the operations/functions corresponding to those software instructions in a dedicated manner analogous to an ASIC. Therefore, the FPGA circuitry 2000 may perform the operations/functions corresponding to the some or all of the machine readable instructions of FIG. 17 faster than the general-purpose microprocessor can execute the same.

In the example of FIG. 20, the FPGA circuitry 2000 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 2000 of FIG. 20 may access and/or load the binary file to cause the FPGA circuitry 2000 of FIG. 20 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 2000 of FIG. 20 to cause configuration and/or structuring of the FPGA circuitry 2000 of FIG. 20, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 2000 of FIG. 20 may access and/or load the binary file to cause the FPGA circuitry 2000 of FIG. 20 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 2000 of FIG. 20 to cause configuration and/or structuring of the FPGA circuitry 2000 of FIG. 20, or portion(s) thereof.

The FPGA circuitry 2000 of FIG. 20, includes example input/output (I/O) circuitry 2002 to obtain and/or output data to/from example configuration circuitry 2004 and/or external hardware 2006. For example, the configuration circuitry 2004 may be implemented by interface circuitry that may obtain a binary file, which may be implemented by a bit stream, data, and/or machine-readable instructions, to configure the FPGA circuitry 2000, or portion(s) thereof. In some such examples, the configuration circuitry 2004 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 2006 may be implemented by external hardware circuitry. For example, the external hardware 2006 may be implemented by the microprocessor 1900 of FIG. 19.

The FPGA circuitry 2000 also includes an array of example logic gate circuitry 2008, a plurality of example configurable interconnections 2010, and example storage circuitry 2012. The logic gate circuitry 2008 and the configurable interconnections 2010 are configurable to instantiate one or more operations/functions that may correspond to at least some of the machine readable instructions of FIG. 17 and/or other desired operations. The logic gate circuitry 2008 shown in FIG. 20 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2008 to enable configuration of the electrical structures and/or the logic gates to form circuits to perform desired operations/functions. The logic gate circuitry 2008 may include other electrical structures such as look-up tables (LUTs), registers (e.g., flip-flops or latches), multiplexers, etc.

The configurable interconnections 2010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2008 to program desired logic circuits.

The storage circuitry 2012 of the illustrated example is structured to store result(s) of the one or more of the operations performed by corresponding logic gates. The storage circuitry 2012 may be implemented by registers or the like. In the illustrated example, the storage circuitry 2012 is distributed amongst the logic gate circuitry 2008 to facilitate access and increase execution speed.

The example FPGA circuitry 2000 of FIG. 20 also includes example dedicated operations circuitry 2014. In this example, the dedicated operations circuitry 2014 includes special purpose circuitry 2016 that may be invoked to implement commonly used functions to avoid the need to program those functions in the field. Examples of such special purpose circuitry 2016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2000 may also include example general purpose programmable circuitry 2018 such as an example CPU 2020 and/or an example DSP 2022. Other general purpose programmable circuitry 2018 may additionally or alternatively be present such as a GPU, an XPU, etc., that can be programmed to perform other operations.

Although FIGS. 19 and 20 illustrate two example implementations of the programmable circuitry 1812 of FIG. 18, many other approaches are contemplated. For example, FPGA circuitry may include an on-board CPU, such as one or more of the example CPU 2020 of FIG. 19. Therefore, the programmable circuitry 1812 of FIG. 18 may additionally be implemented by combining at least the example microprocessor 1900 of FIG. 19 and the example FPGA circuitry 2000 of FIG. 20. In some such hybrid examples, one or more cores 1902 of FIG. 19 may execute a first portion of the machine readable instructions represented by the flowchart of FIG. 17 to perform first operation(s)/function(s), the FPGA circuitry 2000 of FIG. 20 may be configured and/or structured to perform second operation(s)/function(s) corresponding to a second portion of the machine readable instructions represented by the flowcharts of FIG. 17, and/or an ASIC may be configured and/or structured to perform third operation(s)/function(s) corresponding to a third portion of the machine readable instructions represented by the flowchart of FIG. 17.

It should be understood that some or all of the circuitry of FIG. 16 may, thus, be instantiated at the same or different times. For example, same and/or different portion(s) of the microprocessor 1900 of FIG. 19 may be programmed to execute portion(s) of machine-readable instructions at the same and/or different times. In some examples, same and/or different portion(s) of the FPGA circuitry 2000 of FIG. 20 may be configured and/or structured to perform operations/functions corresponding to portion(s) of machine-readable instructions at the same and/or different times.

In some examples, some or all of the circuitry of FIG. 16 may be instantiated, for example, in one or more threads executing concurrently and/or in series. For example, the microprocessor 1900 of FIG. 19 may execute machine readable instructions in one or more threads executing concurrently and/or in series. In some examples, the FPGA circuitry 2000 of FIG. 20 may be configured and/or structured to carry out operations/functions concurrently and/or in series. Moreover, in some examples, some or all of the circuitry of FIG. 16 may be implemented within one or more virtual machines and/or containers executing on the microprocessor 1900 of FIG. 19.

In some examples, the programmable circuitry 1812 of FIG. 18 may be in one or more packages. For example, the microprocessor 1900 of FIG. 19 and/or the FPGA circuitry 2000 of FIG. 20 may be in one or more packages. In some examples, an XPU may be implemented by the programmable circuitry 1812 of FIG. 18, which may be in one or more packages. For example, the XPU may include a CPU (e.g., the microprocessor 1900 of FIG. 19, the CPU 2020 of FIG. 20, etc.) in one package, a DSP (e.g., the DSP 2022 of FIG. 20) in another package, a GPU in yet another package, and an FPGA (e.g., the FPGA circuitry 2000 of FIG. 20) in still yet another package.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

Example methods, apparatus, systems, and articles of manufacture to enable cost-effective and highly portable vehicle guidance are disclosed herein. Further examples and combinations thereof include the following:

Example 1 includes a method comprising digitizing at least one signal received at an antenna array of a receiver of a vehicle to digitized data streams of I and Q samples, the at least one signal received from a beacon, the at least one signal modulated with a pseudorandom code at the beacon, correlating the I and Q samples to a locally generated pseudorandom code of the receiver to recover carrier signals, and calculating, based on relative phase characteristics of the recovered carrier signals, a direction of arrival of the at least one signal from the beacon in a vehicle reference frame.

Example 2 includes the method as defined in example 1, further including determining at least one signal error of the digitized data streams.

Example 3 includes the method as defined in example 2, further including driving a numerically controlled oscillator based on the at least one signal error for recovery of the carrier signals via at least one modulator of the receiver.

Example 4 includes the method as defined in example 2, further including determining the at least one signal error by averaging errors of the digitized data streams.

Example 5 includes the method as defined in example 1, further including utilizing a delay lock loop (DLL) to track a pseudorandom noise (PRN) sequence with a signal received at an antenna of the array, and demodulating or despreading signals of other antennas of the array with the PRN sequence.

Example 6 includes the method as defined in example 1, further including synchronizing, with a delay lock loop, the digitized data streams with locally generated copies of the pseudorandom code.

Example 7 includes the method as defined in example 1, further including determining a position of the vehicle in a beacon reference frame by combining the direction of arrival based on the recovered carrier signals in the vehicle reference frame with measurements of pitch, roll, heading and height.

Example 8 includes an apparatus for guidance of a vehicle, the apparatus comprising interface circuitry communicatively coupled to an antenna array of the vehicle, the antenna array including respective antennas to receive a signal transmitted from a beacon, the transmitted signal modulated with a pseudorandom code at the beacon, machine-readable instructions, and at least one processor circuit to be programmed by the machine-readable instructions to down convert and digitize signals received at the antenna array to baseband I and Q samples, correlate the I and Q samples to a locally generated pseudorandom code to align the received signals in time, recover carrier signals by modulating the received signals with a synchronized pseudorandom noise (PRN) code to despread the received signals, and calculate, based on relative phase characteristics of the recovered carrier signals, a heading and an elevation of a direction of arrival of the signal transmitted from the beacon in a vehicle reference frame.

Example 9 includes the apparatus as defined in example 8, wherein one or more of the at least one processor circuit is to determine at least one signal error of the digitized signals.

Example 10 includes the apparatus as defined in example 9, wherein one or more of the at least one processor circuit is to drive a numerically controlled oscillator based on the at least one signal error for recovery of the carrier signals via at least one modulator of the receiver.

Example 11 includes the apparatus as defined in example 9, wherein one or more of the at least one processor circuit is to determine the at least one signal error by averaging errors of the digitized signals.

Example 12 includes the apparatus as defined in example 8, wherein one or more of the at least one processor circuit is to synchronize the locally generated pseudorandom code with the pseudorandom code corresponding to the beacon.

Example 13 includes the apparatus as defined in example 8, wherein one or more of the at least one processor circuit is to synchronize, with a delay lock loop, the digitized signals with locally generated copies of code.

Example 14 includes the apparatus as defined in example 8, wherein one or more of the at least one processor circuit is to determine a position of the vehicle in a beacon reference frame by combining the direction of arrival based on the recovered carrier signals in the vehicle reference frame with measurements of pitch, roll, heading and height.

Example 15 includes a receiver for guidance of a vehicle, the receiver comprising an array of antennas to receive a signal transmitted from a beacon, the transmitted signal modulated with a pseudorandom code at the beacon, a digitizer to digitize signals received at the antennas into digitized signals with I and Q samples, the digitized signals modulated with a locally generated pseudorandom code, and a software-defined radio to correlate the I and Q samples to a locally generated pseudorandom code for recovery of carrier signals from the digitized signals, and calculate, based on relative phase characteristics of the recovered carrier signals, a direction of arrival of the signal from the beacon in a vehicle reference frame.

Example 16 includes the receiver as defined in example 15, wherein the software-defined radio is to determine at least one signal error of the digitized signals.

Example 17 includes the receiver as defined in example 16, wherein the software-defined radio is to drive a numerically controlled oscillator based on the at least one signal error for recovery of the carrier signals via at least one modulator of the receiver.

Example 18 includes the receiver as defined in example 15, wherein the software-defined radio is to utilize a delay lock to loop DLL to track a PRN sequence with a signal received at an antenna of the array, and demodulate or despread signals of other antennas of the array with the PRN sequence.

Example 19 includes the receiver as defined in example 15, wherein the software-defined radio is to synchronize, with a delay lock loop, the digitized signals with locally generated copies of code.

Example 20 includes the receiver as defined in example 15, wherein the software-defined radio is to determine a position of the vehicle based on the recovered carrier signals.

Example 21 includes a non-transitory machine readable storage medium comprising instructions to cause at least one processor circuit to at least digitize signals received at an antenna array of a receiver of a vehicle to data streams of I and Q samples, the signals received corresponding to a transmitted signal from a beacon, the transmitted signal modulated with a pseudorandom code at the beacon, correlate the I and Q samples to a locally generated pseudorandom code of the receiver to align the received signals in time, recover carrier signals by modulating the signals with a synchronized pseudorandom noise (PRN) code to despread the received signals, and calculate, based on relative phase characteristics of the recovered carrier signals, a heading and an elevation of a direction of arrival of the vehicle with respect to the beacon in a vehicle reference frame.

Example 22 includes the non-transitory machine readable storage medium as defined in example 21, wherein the instructions cause one or more of the at least one processor circuit to determine at least one signal error of the digitized signals.

Example 23 includes the non-transitory machine readable storage medium as defined in example 22, wherein the instructions cause one or more of the at least one processor circuit to drive a numerically controlled oscillator based on the at least one signal error for recovery of the carrier signals via at least one modulator of the receiver.

Example 24 includes the non-transitory machine readable storage medium as defined in example 21, wherein the instructions cause one or more of the at least one processor circuit to synchronize, with a delay lock loop, the digitized signals with locally generated copies of the pseudorandom code.

Example 25 includes the non-transitory machine readable storage medium as defined in example 21, wherein the instructions cause one or more of the at least one processor circuit to determine a position of the vehicle in a beacon reference frame by combining the direction of arrival based on the recovered carrier signals in the vehicle reference frame with measurements of pitch, roll, heading and height.

From the foregoing, it will be appreciated that example systems, apparatus, articles of manufacture, and methods have been disclosed that enable cost-effective and highly portable guidance support. Further, examples disclosed herein can efficiently utilize frequency spectrum. Disclosed systems, apparatus, articles of manufacture, and methods improve the efficiency of using a computing device by reducing necessitated computations. Disclosed systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A method comprising:

digitizing at least one signal received at an antenna array of a receiver of a vehicle to digitized data streams of I and Q samples, the at least one signal received from a beacon, the at least one signal modulated with a pseudorandom code at the beacon;

correlating the I and Q samples to a locally generated pseudorandom code of the receiver to recover carrier signals; and calculating, based on relative phase characteristics of the recovered carrier signals, a direction of arrival of the at least one signal from the beacon in a vehicle reference frame.

2. The method as defined in claim 1, further including determining at least one signal error of the digitized data streams.

3. The method as defined in claim 2, further including driving a numerically controlled oscillator based on the at least one signal error for recovery of the carrier signals via at least one modulator of the receiver.

4. The method as defined in claim 2, further including determining the at least one signal error by averaging errors of the digitized data streams.

5. The method as defined in claim 1, further including:

utilizing a delay lock loop (DLL) to track a pseudorandom noise (PRN) sequence with a signal received at an antenna of the array, and demodulating or despreading signals of other antennas of the array with the PRN sequence.

6. The method as defined in claim 1, further including synchronizing, with a delay lock loop, the digitized data streams with locally generated copies of the pseudorandom code.

7. The method as defined in claim 1, further including determining a position of the vehicle in a beacon reference frame by combining the direction of arrival based on the recovered carrier signals in the vehicle reference frame with measurements of pitch, roll, heading and height.

8. An apparatus for guidance of a vehicle, the apparatus comprising:

interface circuitry communicatively coupled to an antenna array of the vehicle, the antenna array including respective antennas to receive a signal transmitted from a beacon, the transmitted signal modulated with a pseudorandom code at the beacon;

machine-readable instructions; and at least one processor circuit to be programmed by the machine-readable instructions to:

down convert and digitize signals received at the antenna array to baseband I and Q samples;

correlate the I and Q samples to a locally generated pseudorandom code to align the received signals in time;

recover carrier signals by modulating the received signals with a synchronized pseudorandom noise (PRN) code to despread the received signals; and calculate, based on relative phase characteristics of the recovered carrier signals, a heading and an elevation of a direction of arrival of the signal transmitted from the beacon in a vehicle reference frame.

9. The apparatus as defined in claim 8, wherein one or more of the at least one processor circuit is to determine at least one signal error of the digitized signals.

10. The apparatus as defined in claim 9, wherein one or more of the at least one processor circuit is to drive a numerically controlled oscillator based on the at least one signal error for recovery of the carrier signals via at least one modulator of the receiver.

11. The apparatus as defined in claim 9, wherein one or more of the at least one processor circuit is to determine the at least one signal error by averaging errors of the digitized signals.

12. The apparatus as defined in claim 8, wherein one or more of the at least one processor circuit is to synchronize the locally generated pseudorandom code with the pseudorandom code corresponding to the beacon.

13. The apparatus as defined in claim 8, wherein one or more of the at least one processor circuit is to synchronize, with a delay lock loop, the digitized signals with locally generated copies of code.

14. The apparatus as defined in claim 8, wherein one or more of the at least one processor circuit is to determine a position of the vehicle in a beacon reference frame by combining the direction of arrival based on the recovered carrier signals in the vehicle reference frame with measurements of pitch, roll, heading and height.

15. A receiver for guidance of a vehicle, the receiver comprising:

an array of antennas to receive a signal transmitted from a beacon, the transmitted signal modulated with a pseudorandom code at the beacon;

a digitizer to digitize signals received at the antennas into digitized signals with I and Q samples, the digitized signals modulated with a locally generated pseudorandom code; and a software-defined radio to:

correlate the I and Q samples to a locally generated pseudorandom code for recovery of carrier signals from the digitized signals; and calculate, based on relative phase characteristics of the recovered carrier signals, a direction of arrival of the signal from the beacon in a vehicle reference frame.

16. The receiver as defined in claim 15, wherein the software-defined radio is to determine at least one signal error of the digitized signals.

17. The receiver as defined in claim 16, wherein the software-defined radio is to drive a numerically controlled oscillator based on the at least one signal error for recovery of the carrier signals via at least one modulator of the receiver.

18. The receiver as defined in claim 15, wherein the software-defined radio is to:

utilize a delay lock to loop DLL to track a PRN sequence with a signal received at an antenna of the array, and demodulate or despread signals of other antennas of the array with the PRN sequence.

19. The receiver as defined in claim 15, wherein the software-defined radio is to synchronize, with a delay lock loop, the digitized signals with locally generated copies of code.

20. The receiver as defined in claim 15, wherein the software-defined radio is to determine a position of the vehicle based on the recovered carrier signals.

21. A non-transitory machine readable storage medium comprising instructions to cause at least one processor circuit to at least:

digitize signals received at an antenna array of a receiver of a vehicle to data streams of I and Q samples, the signals received corresponding to a transmitted signal from a beacon, the transmitted signal modulated with a pseudorandom code at the beacon;

correlate the I and Q samples to a locally generated pseudorandom code of the receiver to align the received signals in time;

recover carrier signals by modulating the signals with a synchronized pseudorandom noise (PRN) code to despread the received signals; and calculate, based on relative phase characteristics of the recovered carrier signals, a heading and an elevation of a direction of arrival of the vehicle with respect to the beacon in a vehicle reference frame.

22. The non-transitory machine readable storage medium as defined in claim 21, wherein the instructions cause one or more of the at least one processor circuit to determine at least one signal error of the digitized signals.

23. The non-transitory machine readable storage medium as defined in claim 22, wherein the instructions cause one or more of the at least one processor circuit to drive a numerically controlled oscillator based on the at least one signal error for recovery of the carrier signals via at least one modulator of the receiver.

24. The non-transitory machine readable storage medium as defined in claim 21, wherein the instructions cause one or more of the at least one processor circuit to synchronize, with a delay lock loop, the digitized signals with locally generated copies of the pseudorandom code.

25. The non-transitory machine readable storage medium as defined in claim 21, wherein the instructions cause one or more of the at least one processor circuit to determine a position of the vehicle in a beacon reference frame by combining the direction of arrival based on the recovered carrier signals in the vehicle reference frame with measurements of pitch, roll, heading and height.

\* \* \* \* \*